US010392273B2

(12) United States Patent
Sasabe et al.

(10) Patent No.: US 10,392,273 B2
(45) Date of Patent: Aug. 27, 2019

(54) ION EXCHANGE MEMBRANE, ION EXCHANGE MEMBRANE LAMINATED BODY PROVIDED WITH ION EXCHANGE MEMBRANE, ELECTROCHEMICAL CELL PROVIDED WITH ION EXCHANGE MEMBRANE LAMINATED BODY, AND WATER TREATMENT APPARATUS PROVIDED WITH ELECTROCHEMICAL CELL

(71) Applicant: Panasonic Intellectual Property Management Co., Ltd., Osaka (JP)

(72) Inventors: Shigeru Sasabe, Shiga (JP); Yuji Nakata, Shiga (JP); Daisuke Suzuki, Shiga (JP); Tomoko Tani, Osaka (JP); Yoshinao Ooe, Kyoto (JP); Katsuhiko Uno, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 146 days.

(21) Appl. No.: 15/118,860

(22) PCT Filed: Mar. 11, 2015

(86) PCT No.: PCT/JP2015/001333
§ 371 (c)(1),
(2) Date: Aug. 13, 2016

(87) PCT Pub. No.: WO2015/162844
PCT Pub. Date: Oct. 29, 2015

(65) Prior Publication Data
US 2017/0057848 A1 Mar. 2, 2017

(30) Foreign Application Priority Data

Apr. 24, 2014 (JP) .................................. 2014-089861
May 23, 2014 (JP) .................................. 2014-107217
Sep. 30, 2014 (JP) .................................. 2014-201586

(51) Int. Cl.
*C02F 1/461* (2006.01)
*B01J 47/12* (2017.01)
(Continued)

(52) U.S. Cl.
CPC .......... *C02F 1/46104* (2013.01); *B01J 39/04* (2013.01); *B01J 39/18* (2013.01); *B01J 41/04* (2013.01);
(Continued)

(58) Field of Classification Search
CPC ...... C02F 2201/46115; C02F 2201/003; C02F 1/4695
(Continued)

(56) References Cited

U.S. PATENT DOCUMENTS 1,388,466 A * 8/1921 Hooker ................. C25B 15/08
 205/352
5,376,253 A * 12/1994 Rychen ................. B01D 61/46
 204/632
(Continued)

FOREIGN PATENT DOCUMENTS

CN 103502155 A 1/2014
EP 1017482 A1 7/2000
(Continued)

OTHER PUBLICATIONS

Chinese Search Report dated Jun. 27, 2018 for the related Chinese Patent Application No. 201580009159.2, 2 pages.
(Continued)

*Primary Examiner* — Zulmariam Mendez
(74) *Attorney, Agent, or Firm* — Hamre, Schumann, Mueller & Larson, P.C.

(57) ABSTRACT

An ion exchange membrane is provided with a first cation exchange composition which has a cation exchange group
(Continued)

and is formed in a sheet form; a first anion exchange composition which is disposed to be in contact with the first cation exchange composition, has an anion exchange group, and is formed in a sheet form. Furthermore, the ion exchange membrane is provided with a second cation exchange composition which has a cation exchange group, which is formed in a sheet form, and which is disposed to be opposed to the first cation exchange composition, and through which water permeates more easily than in the first cation exchange composition; and a second anion exchange composition which has an anion exchange group, which is formed in a sheet form, and which is disposed to be opposed to the first anion exchange composition, and through which water permeates more easily than in the first anion exchange composition.

9 Claims, 13 Drawing Sheets

(51) Int. Cl.
| | | |
|---|---|---|
| B01J 39/04 | (2017.01) | |
| B01J 39/18 | (2017.01) | |
| B01J 41/04 | (2017.01) | |
| B01J 41/12 | (2017.01) | |
| C02F 1/46 | (2006.01) | |
| C02F 5/08 | (2006.01) | |
| C02F 1/42 | (2006.01) | |
| C02F 101/10 | (2006.01) | |
| C02F 101/12 | (2006.01) | |

(52) U.S. Cl.
CPC ............... *B01J 41/12* (2013.01); *B01J 47/12* (2013.01); *C02F 1/4602* (2013.01); *C02F 1/42* (2013.01); *C02F 5/08* (2013.01); *C02F 2001/427* (2013.01); *C02F 2101/101* (2013.01); *C02F 2101/12* (2013.01); *C02F 2201/46115* (2013.01); *C02F 2201/46125* (2013.01); *C02F 2201/46145* (2013.01); *C02F 2209/005* (2013.01); *C02F 2209/06* (2013.01); *C02F 2209/40* (2013.01)

(58) Field of Classification Search
USPC .......................................................... 204/260
See application file for complete search history.

(56) References Cited

U.S. PATENT DOCUMENTS

| | | |
|---|---|---|
| 2004/0122117 A1 | 6/2004 | Yamanaka et al. |
| 2006/0016685 A1 | 1/2006 | Hawkins et al. |
| 2010/0126867 A1* | 5/2010 | Riviello ................. B01D 61/48 |
| | | 204/632 |

FOREIGN PATENT DOCUMENTS

| | | |
|---|---|---|
| EP | 1768768 A2 | 4/2007 |
| EP | 2708514 A1 | 3/2014 |
| EP | 2933021 A1 | 10/2015 |
| JP | 11-349710 | 12/1999 |
| JP | 2000-070679 | 3/2000 |
| JP | 2008-507406 | 3/2008 |
| JP | 2010-069407 A | 4/2010 |
| JP | 2012-236171 | 12/2012 |
| JP | 2014-069120 A | 4/2014 |
| JP | 2014-069122 A | 4/2014 |
| WO | 2002/083770 | 10/2002 |
| WO | 2012/157236 | 11/2012 |
| WO | 2013/040450 A1 | 3/2013 |
| WO | 2014/091726 A1 | 6/2014 |

OTHER PUBLICATIONS

Communication pursuant to Rule 164(1) EPC dated Apr. 3, 2017 for the related European Patent Application No. 15783099.3, 10 pages.
The Extended European Search Report dated Sep. 11, 2017 for the related European Patent Application No. 15783099.3, 17 pages.
International Search Report of PCT application No. PCT/JP2015/001333 dated May 19, 2015.

* cited by examiner

PRIOR ART

ION EXCHANGE MEMBRANE, ION EXCHANGE MEMBRANE LAMINATED BODY PROVIDED WITH ION EXCHANGE MEMBRANE, ELECTROCHEMICAL CELL PROVIDED WITH ION EXCHANGE MEMBRANE LAMINATED BODY, AND WATER TREATMENT APPARATUS PROVIDED WITH ELECTROCHEMICAL CELL

TECHNICAL FIELD

The present invention relates to a configuration of an ion exchange membrane, an electrochemical cell provided with an ion exchange membrane, and a water treatment apparatus provided with an electrochemical cell.

BACKGROUND ART

A water treatment apparatus removes impurities in water by adsorbing and removing cations or anions using an ion exchange resin. There are cases where an ion exchange membrane where a cation exchange group is disposed on one surface and an anion exchange group is disposed on the other surface is used in a water treatment apparatus (for example, refer to PTL 1).

Textured membranes where peaks and troughs are disposed at intervals are known as the ion exchange membrane of the water treatment apparatus, (for example, refer to PTL 1). FIG. 13 is a schematic diagram which shows a schematic configuration of the textured membrane disclosed in PTL 1.

As shown in FIG. 13, a textured membrane 105 disclosed in PTL 1 has a cation exchange layer 101 and an anion exchange layer 102 adjacent to the cation exchange layer 101, in which peaks 103 and troughs 104 are disposed at intervals. Since the surface area of a membrane is increased by the peaks 103 and the troughs 104 which are formed on the textured membrane 105, in a case of supplying water which includes hard components to the textured membrane 105, it is possible to increase the adsorption speed of the hard components. In addition, regarding the peaks 103 and the troughs 104 of the textured membrane 105, in a case of using a plurality of laminated textured membranes 105, it is possible to suppress pressure loss to be low since the path of the treatment water is formed between the peaks 103 and the troughs 104 as shown by an arrow 106.

In addition, PTL 1 discloses an electrochemical cell where an electrode 107 and an electrode 108 are disposed on both sides of the textured membrane 105. In the electrochemical cell disclosed in PTL 1, H+ and OH− are generated by dissociating water at an interface 109 of the cation exchange layer 101 and the anion exchange layer 102 by applying voltage to both electrodes in the presence of water. It is possible to regenerate the cation exchange layer 101 and the anion exchange layer 102 by substituting the H+ and OH−, and the cations and anions which are adsorbed in the cation exchange layer 101 and the anion exchange layer 102. Therefore, in the electrochemical cell disclosed in PTL 1, regeneration using a chemical agent is not necessary as in the related art.

However, even with the electrochemical cell which has the textured membrane 105 disclosed in PTL 1, since water flows only on a surface of the textured membrane 105 and only a portion which is exposed on a surface of the cation exchange layer 101 and the anion exchange layer 102 reacts, there is a first problem in that the ability to adsorb the hard components using the cation exchange layer 101 and the anion exchange layer 102 is not sufficiently obtained.

In addition, even with a water treatment apparatus which uses the textured membrane 105 disclosed in PTL 1, there is still room for the improvement from the point of view of making the flow of water in the apparatus uniform. In detail, in a case of arranging the textured membrane 105 by setting the direction of the arrow 106 to the vertical direction, there is a concern that a path which is formed between the peaks 103 and the troughs 104 will be crushed due to the shape of the membrane being changed under the weight of the textured membrane 105 itself and that the pressure loss will be large. In addition, when the path is crushed, since water is not able to flow in the path, there is a second problem in that there is a concern in that it is not possible to sufficiently adsorb the hard components.

CITATION LIST

Patent Literature

PTL 1: JP-T-2008-507406

SUMMARY OF THE INVENTION

In order to solve the problems in the prior art described above, the ion exchange membrane according to the present invention is provided with a first cation exchange composition which has a cation exchange group and which is formed in a sheet form, and through which water does not easily permeate, and a first anion exchange composition which is disposed to be in contact with the first cation exchange composition, which has an anion exchange group, and which is formed in a sheet form, and through which water does not easily permeate. Furthermore, the ion exchange membrane is provided with a second cation exchange composition which has a cation exchange group, which is formed in a sheet form, and which is disposed to be opposed to the first cation exchange composition, and through which water permeates more easily than in the first cation exchange composition, and a second anion exchange composition which has an anion exchange group, which is formed in a sheet form, and which is disposed to be opposed to the first anion exchange composition, and through which water permeates more easily than in the first anion exchange composition.

Due to this, it is possible to sufficiently adsorb hard components by actively adsorbing hard components such as Ca and Mg, chlorine ions, or sulfuric acid ions in the second cation exchange composition and the second anion exchange composition and it is also possible to efficiently regenerate the ion exchange composition by efficiently dissociating water at an interface between a first cation exchange composition and a first anion exchange composition.

In addition, the ion exchange membrane laminated body according to the present invention is an ion exchange membrane laminated body where two or more ion exchange membranes are laminated to oppose each other and is provided with a spacer member which has a communicating structure between the front and rear surfaces between the ion exchange membranes.

Due to this, water easily permeates into the ion exchange membranes and is able to efficiently come into contact with ion exchange groups in the ion exchange membranes and it is possible to efficiently execute the water treatment.

In addition, the electrochemical cell according to the present invention is provided with the ion exchange membrane laminated body, electrodes which are disposed such that an anode and a cathode are opposed to each other, and a partitioning board which has water permeability. In addition, the ion exchange membrane laminated body is disposed between electrodes, the ion exchange membrane is laminated in a direction orthogonal to the vertical direction, two or more of the ion exchange membrane laminated bodies are disposed to be lined up when viewed from the lamination direction of the ion exchange membranes, and the partitioning board is installed between the ion exchange membrane laminated bodies which are adjacent to each other.

Due to this, it is possible to make the flow of water in an electrochemical cell uniform and to make the electrochemical cell more efficient.

Furthermore, the water treatment apparatus according to the present invention is provided with an electrochemical cell, a power source which supplies electrical power to electrodes, and a first water flow path which is connected to an outflow opening, which has a water intake opening, and through which water passes. In addition, the water treatment apparatus is provided with a second water flow path which is branched from the first water flow path and has a water drainage opening, a flow path switching device which switches the flow of water to the water intake opening or the water drainage opening, and a controller which controls the power source and the flow path switching device.

Due to this, it is possible to efficiently execute the water treatment.

The objects described above, other objects, features, and advantages of the present invention will be clear from the detailed description of favorable exemplary embodiments below with reference to the attached drawings.

According to the ion exchange membrane, the ion exchange membrane laminated body provided with the ion exchange membrane, the electrochemical cell provided with the ion exchange membrane laminated body, and the water treatment apparatus provided with the electrochemical cell according to the present invention, it is possible to sufficiently adsorb hard components and it is also possible to efficiently regenerate an ion exchange composition.

DESCRIPTION OF EMBODIMENTS

Figure 1:
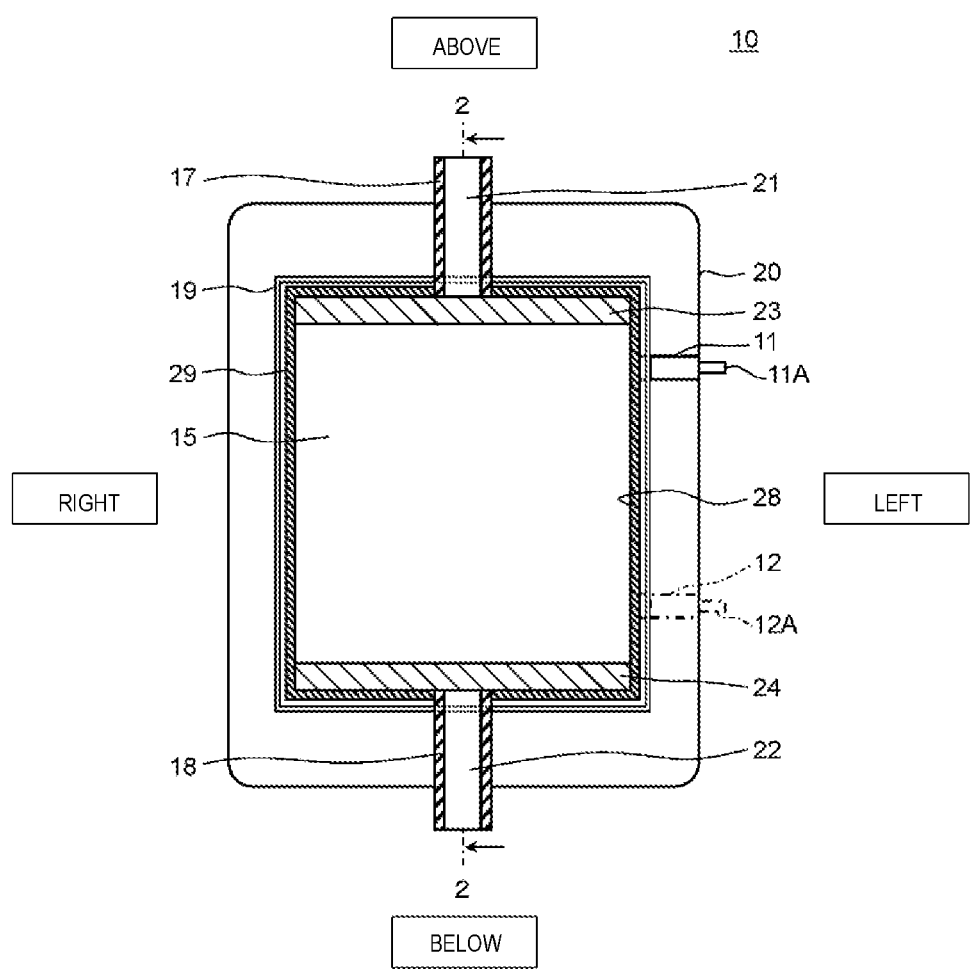
FIG. 1 is a cross-sectional diagram from a front surface direction which shows a schematic configuration of an electrochemical cell according to a present exemplary embodiment 1.

Description will be given below of exemplary embodiments of the present invention with reference to the diagrams. Here, in all the diagrams, the same reference numerals are applied to the same or equivalent parts and overlapping description thereof may be omitted. In addition, in all the diagrams, constituent elements which are necessary for describing the present invention are excerpted for illustration and the illustration of the other constituent elements may be omitted. Furthermore, the present invention is not limited to the exemplary embodiments below.

Exemplary Embodiment 1

An ion exchange membrane according to the present exemplary embodiment 1 is formed of a first cation exchange composition which has a cation exchange group and is formed in a sheet form and a first anion exchange composition which is disposed to be in contact with the first cation exchange composition, which has an anion exchange group, and which is formed in a sheet form, and through which water does not easily permeate. Furthermore, the ion exchange membrane is formed of a second cation exchange composition which has a cation exchange group, which is formed in a sheet form, and which is disposed to be opposed to the first cation exchange composition, and through which water permeates more easily than in the first cation exchange composition, and a second anion exchange composition which has an anion exchange group, which is formed in a sheet form, and which is disposed to be opposed to the first anion exchange composition, and through which water permeates more easily than in the first anion exchange composition.

In addition, an ion exchange membrane laminated body according to the present exemplary embodiment 1 is an ion exchange membrane laminated body where two or more ion exchange membranes are laminated to oppose each other and is provided with a spacer member which is disposed between the two of the ion exchange membranes and has a communicating structure between the front and rear surfaces.

Furthermore, an electrochemical cell according to the present exemplary embodiment 1 is provided with the ion exchange membrane laminated body and electrodes which are disposed such that an anode and a cathode are opposed to each other.

Description will be given below of an example of the ion exchange membrane, the ion exchange membrane laminated body provided with the ion exchange membrane, and the electrochemical cell provided with the ion exchange membrane laminated body according to the present exemplary embodiment 1 with reference to FIG. 1 to FIG. 5.

[Configuration of Electrochemical Cell]

Figure 2:
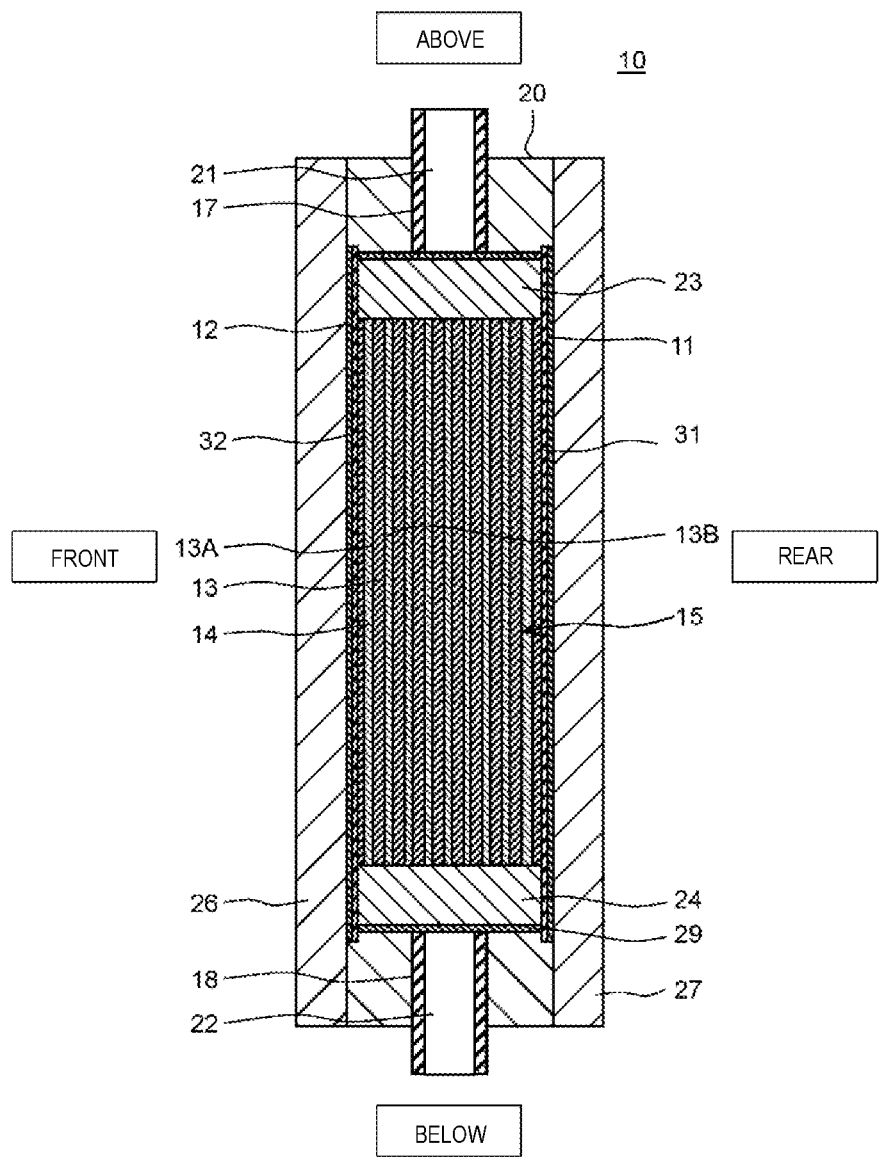
FIG. 2 is a cross-sectional diagram of the electrochemical cell along a line 2-2 shown in FIG. 1.

FIG. 1 is a cross-sectional diagram from a front direction which shows a schematic configuration of the electrochemical cell according to the present exemplary embodiment 1. FIG. 2 is a cross-sectional diagram of the electrochemical cell along the line 2-2 shown in FIG. 1. Here, in FIG. 1 and FIG. 2, the vertical direction, the horizontal direction, and the front and back direction of the electrochemical cell are represented as the vertical direction, the horizontal direction, and the front and back direction in the diagrams.

As shown in FIG. 1 and FIG. 2, an electrochemical cell 10 according to the present exemplary embodiment 1 is provided with an anode 11, a cathode 12, an ion exchange membrane laminated body 15, a first rectification member 24, a second rectification member 23, a casing 20, a first outer board 26, and a second outer board 27. The anode 11 and the cathode 12 are disposed so as to sandwich the casing 20 in the front and back direction.

The anode 11 and the cathode 12 are formed of titanium and the surfaces thereof are coated by platinum and iridium oxide. The anode 11 and the cathode 12 are formed so as to cover a through hole 28 of the casing 20 will be described below.

Here, in the electrochemical cell 10 according to the present exemplary embodiment 1, a form is adopted in which a terminal 11A of the anode 11 and a terminal 12A of the cathode 12 are disposed on the left side, the terminal 11A is disposed on the upper section, and the terminal 12A is disposed on the lower section; however, the present invention is not limited thereto. For example, a form may be adopted in which the terminal 11A and the terminal 12A are disposed horizontally to each be positioned on the upper section.

In addition, the first outer board 26 and the second outer board 27 are disposed so as to sandwich the anode 11, a second sealing member 19, the casing 20, and the cathode 12 and the members are, for example, fixed by screws or the like.

The casing 20 is formed in a board form and the through hole (inner space) 28 is provided in the main surface thereof. The inner peripheral surface (opening of the through hole 28) of the casing 20 is formed with a quadrilateral shape in the present exemplary embodiment 1. In addition, a first sealing member 29 is installed in the inner peripheral surface of the casing 20. The first sealing member 29 is formed to be circular and is, for example, formed of an olefin-based foam material or the like. In FIG. 1, the first sealing member 29 is disposed both above and below the ion exchange membrane laminated body 15, but may be only disposed at the side of the ion exchange membrane laminated body 15. Furthermore, the second sealing member 19 is disposed at the periphery of the casing 20 so as to surround the through hole 28. Here, the second sealing member 19 is, for example, formed of silicon-based rubber or the like.

In addition, a through hole which extends in the vertical direction and which communicates with the through hole 28 in the main surface of the casing 20 is formed in the lower end surface of the casing 20 and the through hole forms an inflow opening 22. An appropriate pipe is connected to the inflow opening 22 and the pipe forms a third water flow path 18. Water for treatment or water for regeneration is supplied to the third water flow path 18.

In the same manner, a through hole which extends in the vertical direction and which communicates with the through hole 28 in the main surface of the casing 20 is formed on the upper end surface of the casing 20 and the through hole forms an outflow opening 21. An appropriate pipe is connected to the outflow opening 21 and the pipe forms a first water flow path 17. Water from which height components or the like are removed or water after the ion exchange resin is regenerated is discharged to the first water flow path 17.

Here, water from which hard components or the like are removed by the electrochemical cell 10 is referred to as water for treatment and water used for regenerating an ion exchange resin such as an ion exchange membrane laminated body 15A is referred to as water for regeneration.

The first rectification member 24, the ion exchange membrane laminated body 15, and the second rectification member 23 are installed in order from the bottom in the through hole 28 of the casing 20 and these members are formed by the first sealing member 29 so as to fit into the through hole 28.

The first rectification member 24 and the second rectification member 23 are formed in a board form in the present exemplary embodiment 1. In addition, electric current flows in the water which passes through the ion exchange membrane laminated body 15 and the first rectification member 24 or the second rectification member 23 is preferably formed of an insulating material from the point of view that the electric current does not leak to other portions. Furthermore, from the point of view that the water supplied from the third water flow path 18 uniformly passes through the inside of the electrochemical cell 10, the water passing resistance of the first rectification member 24 or the second rectification member 23 may be greater than that of the ion exchange membrane laminated body 15. The first rectification member 24 or the second rectification member 23 may be formed of, for example, olefin-based resin or the like such as polyethylene and polypropylene, and may be formed by a porous sheet. In addition, materials on which a hydrophilic treatment is carried out may be used.

The ion exchange membrane laminated body 15 is provided with two or more of the ion exchange membranes 13 and a spacer member 14 in a reticular form, in which the spacer member 14 is disposed between the ion exchange membranes 13. Here, description will be given of the ion exchange membranes 13 with reference to FIG. 2 and FIG. 3.

Figure 3:
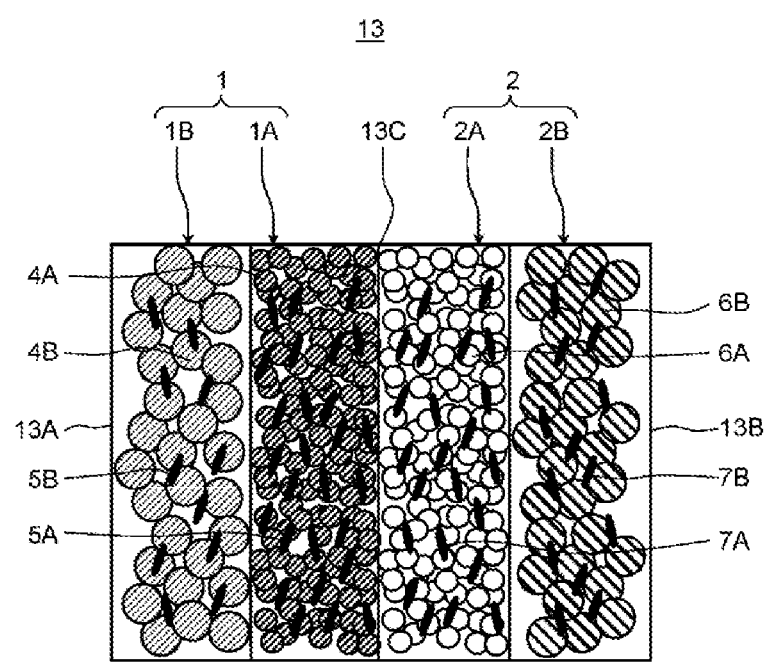
FIG. 3 is a schematic diagram which shows an example of an ion exchange membrane of the electrochemical cell according to the present exemplary embodiment 1.

FIG. 3 is a schematic diagram which shows an example of the ion exchange membrane of the electrochemical cell according to the present exemplary embodiment 1.

Figure 13:
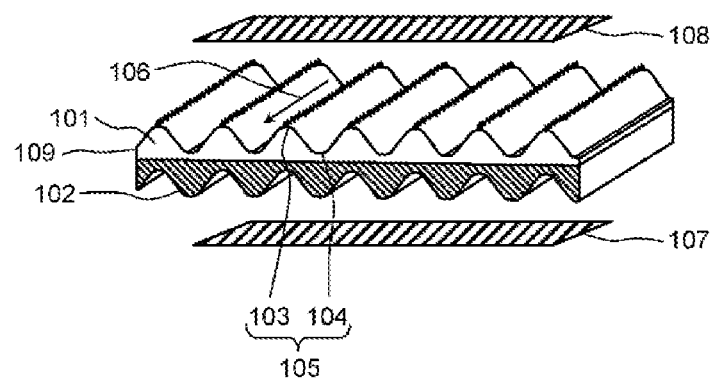
FIG. 13 is a schematic diagram which shows a schematic configuration of the textured membrane disclosed in PTL 1.

As shown in FIG. 3, the ion exchange membrane 13 is provided with a cation exchange composition 1 formed of a first cation exchange composition 1A and a second cation exchange composition 1B, and an anion exchange composition 2 formed of a first anion exchange composition 2A and a second anion exchange composition 2B. The first cation exchange composition 1A, the second cation exchange composition 1B, the first anion exchange composition 2A, and the second anion exchange composition 2B may be formed in a sheet form or may be formed in a wave form as in the textured membrane 105 (refer to FIG. 13) disclosed in PTL 1.

The first cation exchange composition 1A and the first anion exchange composition 2A are laminated such that the main surfaces thereof are opposed to (in contact with) each other. Here, the main surfaces where the first cation exchange composition 1A and the first anion exchange composition 2A are in contact may be bonded or may not be bonded.

The first cation exchange composition 1A and the second cation exchange composition 1B are laminated such that the main surfaces thereof are opposed to (in contact with) each other. Here, the first cation exchange composition 1A and the second cation exchange composition 1B may be bonded or may not be bonded.

In the same manner, the first anion exchange composition 2A and the second anion exchange composition 2B are laminated such that the main surfaces thereof are opposed to (in contact with) each other. Here, the first anion exchange composition 2A and the second anion exchange composition 2B may be bonded or may not be bonded.

The first cation exchange composition 1A is formed so as to allow water to permeate less easily than the second cation exchange composition 1B. In addition, the first anion exchange composition 2A is formed so as to allow water to permeate less easily than the second anion exchange composition 2B.

In detail, as will be described below, in a case where the first cation exchange composition 1A, the first anion exchange composition 2A, the second cation exchange composition 1B, and the second anion exchange composition 2B are formed of a porous material, the first cation exchange composition 1A is formed such that the porosity thereof is less than that of the second cation exchange composition 1B. In the same manner, the first anion exchange composition 2A is formed such that the porosity thereof is less than that of the second anion exchange composition 2B. For example, the porosity of the first cation exchange composition 1A or the first anion exchange composition 2A may be 0.1% to 40%, and the porosity of the second cation exchange composition 1B or the second anion exchange composition 2B may be 5% to 60%. It is sufficient if the porosity of the first cation exchange composition 1A or the first anion exchange composition 2A is less than that of the second cation exchange composition 1B or the second anion exchange composition 2B and it is not necessarily limited to a numeric value.

In addition, the first cation exchange composition 1A and the first anion exchange composition 2A may be formed of a so-called homogeneous membrane which is formed in a sheet form by modifying a functional group after copolymerizing styrene and divinyl benzene (DVB). In this case, it is possible to make the first cation exchange composition 1A and the first anion exchange composition 2A a thin membrane of approximately 0.2 to 0.3 mm, and it is possible to make an electric potential difference large at an interface 13C of the ion exchange membrane 13 which will be described below and to promote water dissociation.

The first cation exchange composition 1A may have first cation exchange resin particles 4A and first binder resin particles 5A and the second cation exchange composition 1B may have second cation exchange resin particles 4B and first binder resin particles 5B. In the same manner, the first anion exchange composition 2A may have first anion exchange resin particles 6A and second binder resin particles 7A, and the second anion exchange composition 2B may have second anion exchange resin particles 6B and second binder resin particles 7B.

As the first cation exchange resin particles 4A, for example, a strongly acidic cation exchange resin which has an exchange group —$SO_3H$ may be used or a weakly acidic cation exchange resin which has an exchange group —RCOOH may be used. In addition, for the first anion exchange resin particles 6A, a strongly basic anion exchange resin which has an exchange group —$NR_3OH$ may be used or a weakly basic anion exchange resin which has —$NR_2$ may be used.

A combination of the first cation exchange resin particles 4A and the first anion exchange resin particles 6A may be a strongly acid cation exchange resin or a strongly basic anion exchange resin. In this case, the adsorption speed of the hard components is improved and it is possible to make the water softer. In addition, a combination of the first cation exchange resin particles 4A and the first anion exchange resin particles 6A may be a weakly acidic cation exchange resin or a weakly basic anion exchange resin. In this case, it is possible to increase the ion exchange capacity and it is possible to increase the water softening treatment amount.

In addition, a combination of the first cation exchange resin particles 4A and the first anion exchange resin particles 6A may be a strongly acidic cation exchange resin and a weakly basic anion exchange resin or may be a weakly acidic cation exchange resin and a strongly basic anion exchange resin. It is considered that, in a case of a combination of a weakly acidic cation exchange resin and a strongly basic anion exchange resin, it is possible to increase the ion exchange capacity and the water softening treatment amount is increased, in addition to which, in a combination of a weakly acidic cation exchange resin and a strongly basic anion exchange resin, the resistance of the membrane is low and there is a catalytic action of water dissociation in the strongly basic group. Therefore, it is possible to make an electric potential difference large at the interface 13C of the ion exchange membrane 13 and to promote water dissociation. Therefore, it is possible to sufficiently regenerate the ion exchange membrane 13.

As the second cation exchange resin particles 4B, a weakly acidic cation exchange resin which has an exchange group —RCOOH is preferably used. In addition, as the second anion exchange resin particles 6B, a weakly basic anion exchange resin which has —NR2 is preferably used. Due to this, it is possible to increase the ion exchange capacity and it is possible to increase a water softening treatment amount. In addition, since a weakly acidic cation exchange resin and a weakly basic anion exchange resin are used, regeneration is easily performed using H+ and OH− which were dissociated from water at the interface of the first cation exchange composition 1A and the first anion exchange composition 2A when regenerating. That is, this is because the weakly acidic cation exchange resin and the weakly basic anion exchange resin have characteristics where regeneration is easy even with a small amount of H+ and OH− since the dissociation constants for becoming acidic and alkaline are small.

On the other hand, the adsorption speed may be increased using a strongly acidic cation exchange resin and a strongly basic anion exchange resin; however, there are cases where the regeneration is not sufficient in comparison with a combination of a weakly acidic cation exchange resin and a weakly basic anion exchange resin.

In addition, the average particle diameter of the second cation exchange resin particles 4B may be larger than the average particle diameter of the first cation exchange resin particles 4A. In the same manner, the average particle diameter of the second anion exchange resin particles 6B may be larger than the average particle diameter of the first anion exchange resin particles 6A. From the point of view of increasing the porosity, the average particle diameter of the second cation exchange resin particles 4B and the second anion exchange resin particles 6B may be 100 to 250 μm. In addition, from the point of view of decreasing the porosity, the average particle diameter of the first cation exchange resin particles 4A and the first anion exchange resin particles 6A may be 1 to 150 μm.

The first binder resin particles 5A and 5B and the second binder resin particles 7A and 7B may be formed of a fluorine-based resin. Examples of fluorine-based resins include polytetrafluoroethylene (PTFE), tetrafluoroethylene.hexafluoropropylene copolymer (FEP), polyvinylidene fluoride (PVDF), tetrafluoroethylene.ethylene copolymer (ETFE), polychlorotrifluoroethylene (PCTFE), tetrafluoroethylene.perfluoroalkyl vinyl ether copolymer (PFA), and the like. From the point of view of heat resistance, alkali resistance, and acid resistance, PTFE is preferable.

Among these, since PTFE and PVDF are binders in a fiber form, it is possible to entwine and fix ion exchange resin particles and suppress the generation of a skin layer on an ion exchange resin surface compared to the time of using other binders, and to increase an ion exchange resin containing amount.

The first cation exchange composition 1A is formed such that the content of the first binder resin particles 5A is larger than the content of the first binder resin particles 5B in the second cation exchange composition 1B. In addition, the first anion exchange composition 2A is formed such that the content of the second binder resin particles 7A is larger than the content of the second binder resin particles 7B in the second anion exchange composition 2B.

In detail, from the point of view of decreasing the porosity, the first binder resin particles 5A may be contained in the first cation exchange composition 1A at 10 to 70 weight %. 20% to 50% is desirable. In the same manner, from the point of view of decreasing the porosity, the second binder resin particles 7A may be contained in the first anion exchange composition 2A at 10 to 70 weight %. 20% to 50% is desirable. In addition, from the point of view of increasing the porosity, the first binder resin particles 5B may be contained in the second cation exchange composition 1B at 5 to 50 weight %. In the same manner, from the point of view of increasing the porosity, the second binder resin particles 7B may be contained in the second anion exchange composition 2B at 5 to 50 weight %. 5% to 30% is desirable.

In addition, the first cation exchange composition 1A, the second cation exchange composition 1B, the first anion exchange composition 2A, and the second anion exchange composition 2B may each have a reinforcing agent. Examples of reinforcing agents include polyethylene oxide (PEO) or polyvinyl alcohol (PVA). By containing a reinforcing agent, it is possible to adhere a binder resin and an ion exchange resin and it is possible to suppress the ion exchange resin from being desorbed from the ion exchange composition. Here, the content of the reinforcing agent of the first cation exchange composition 1A may be more than, may be less than, or may be the same as the content of the reinforcing agent of the second cation exchange composition 1B. In the same manner, the content of the reinforcing agent of the first anion exchange composition 2A may be more than, may be less than, or may be the same as the content of the reinforcing agent of the second anion exchange composition 2B.

In addition, the first cation exchange composition 1A, the second cation exchange composition 1B, the first anion exchange composition 2A, and the second anion exchange composition 2B may each have a conductive material. Examples of conductive materials include particles formed of carbon. Examples of carbon materials include graphite, carbon black, activated carbon, and the like and the materials may be used individually and a combination of a plurality of materials may be used. In addition, the raw material form of the carbon material described above may be any form of a powder form, a fiber form, a particle form, a scale form, and the like. By containing a conductive material, it is possible for the electric potential difference to be large at the interface 13C of the ion exchange membrane 13 and to promote water dissociation.

Furthermore, in a case of using a fibrous binder as a binder resin of the first cation exchange composition 1A, the second cation exchange composition 1B, the first anion exchange composition 2A, and the second anion exchange composition 2B, the first cation exchange composition 1A and the first anion exchange composition 2A may contain polyethylene (PE). Due to this, even when the content of the binder resin of the first cation exchange composition 1A, the second cation exchange composition 1B, the first anion exchange composition 2A, and the second anion exchange composition 2B is the same, it is possible to make water not easily pass through the first cation exchange composition 1A and the first anion exchange composition 2A.

Next, description will be given of the spacer member 14 with reference to FIG. 4 and FIG. 5.

Figure 4:
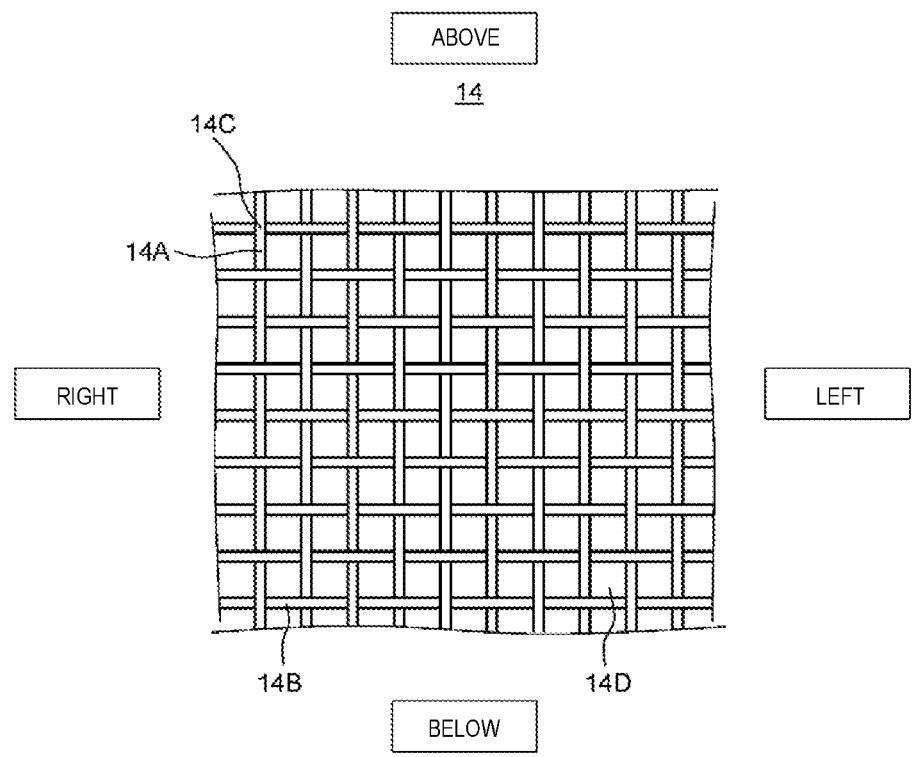
FIG. 4 is a schematic diagram which shows an example of a spacer member of the electrochemical cell according to the present exemplary embodiment 1.

FIG. 4 is a schematic diagram which shows an example of a spacer member of the electrochemical cell according to the present exemplary embodiment 1. In addition, FIG. 5 is a schematic diagram which shows another example of the spacer member of the electrochemical cell according to the present exemplary embodiment 1. Here, in FIG. 4 and FIG. 5, the vertical direction and the horizontal direction of the spacer member are represented as the vertical direction and the horizontal direction in the diagrams.

As shown in FIG. 4, the spacer member 14 has a first member 14A (warp) which extends in the vertical direction and a second member 14B (weft) which extends in the horizontal direction, is formed in a reticular form by knitting the first member 14A and the second member 14B, and has a communicating structure between front and rear surfaces. In more detail, a plurality of through holes are provided in the main surface of the first member 14A and formed such that water passes through the spacer member 14.

In addition, the spacer member 14 has a portion 14C where the first member 14A and the second member 14B intersect (overlap), and a space 14D which is surrounded by the first member 14A and the second member 14B.

It is possible to set the number of mesh holes (the number of the spaces 14D) of the spacer member 14 to be any number and for example, the number of mesh holes may be 10 to 200 mesh holes in order to secure the electric field strength for the ion exchange membrane 13. In addition, regarding the first member 14A and the second member 14B, a level difference at the intersecting point is reducing by setting the line diameter to 50 to 200 μm, water is made to easily pass to the inside of the second cation exchange composition 1B and the second anion exchange composition 2B, and the hard component removal performance is improved.

In addition, from the point of view of preventing electric current from flowing between the ion exchange membranes 13 which are adjacent to each other, the spacer member 14 may have an insulation property. In addition, materials such as polypropylene (PP), polyethylene (PE), and polyester may be used for the spacer member 14.

Figure 5:
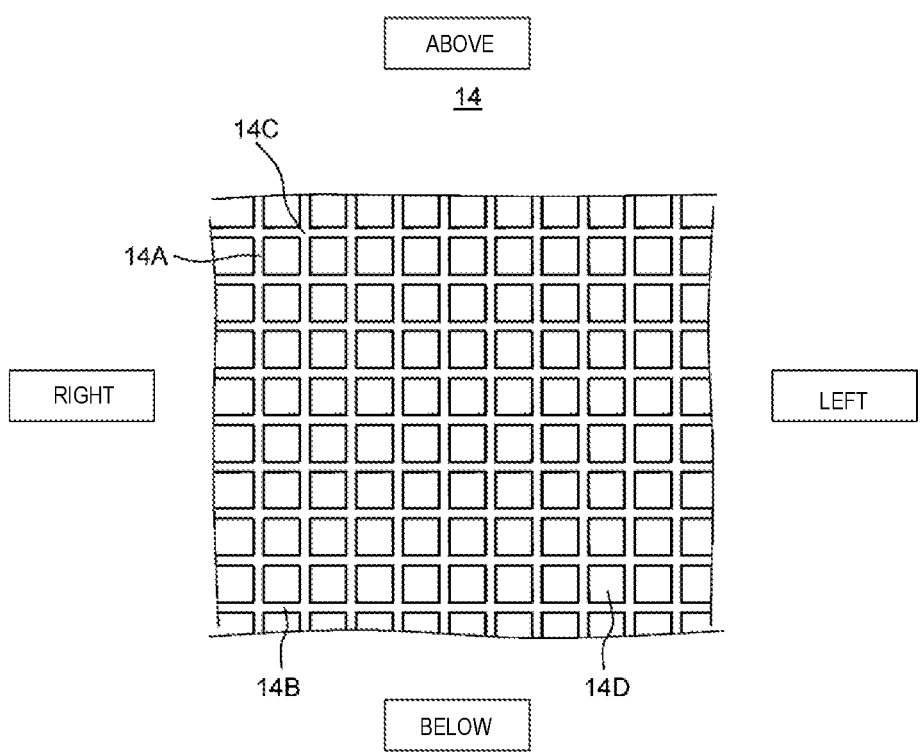
FIG. 5 is a schematic diagram which shows another example of the spacer member of the electrochemical cell according to the present exemplary embodiment 1.

In addition, as shown in FIG. 5, the spacer member 14 may be pressed in the front and back direction by a thermocompression bonding device to weld the portion 14C. In this case, the spacer member 14 may be formed, by making the thickness of the first member 14A, the second member 14B, and the portion 14C the same, such that these are positioned on the same plane, that is, such that the front and rear surfaces are smooth. Due to this, water is made to easily pass to the inside of the second cation exchange composition 1B and the second anion exchange composition 2B and the hard component removal performance is improved.

In addition, although not shown in the diagram, even when using non-woven fabric, it is possible to make the front and rear surfaces of the spacer member 14 smooth and to have the same effects.

Then, as shown in FIG. 2, the ion exchange membrane laminated body 15 is disposed such that a cation exchange surface 13A of the ion exchange membrane 13 is opposed to the cathode 12 and an anion exchange surface 13B is opposed to the anode 11, and a plurality of the ion exchange membranes 13 are laminated in a direction orthogonal to the vertical direction. In addition, the spacer member 14 is disposed between the layers of the ion exchange membranes 13 which are adjacent to each other.

In addition, a separator 31 is disposed between the anode 11 and the ion exchange membrane laminated body 15 and a separator 32 is disposed between the cathode 12 and the ion exchange membrane laminated body 15. The separator 31 and the separator 32 are formed of a material which has an insulation property. Examples of materials which have an insulation property include polyolefin.

In addition, the separator 31 and the separator 32 have a communicating structure between the front and rear surfaces. In detail, the separator 31 and the separator 32 may be formed by a non-woven fabric.

[Operation and Effects of Electrochemical Cell]

Next, description will be given of the operation and effects of the electrochemical cell 10 according to the present exemplary embodiment 1 with reference to FIG. 1 to FIG. 5.

At the time of the water softening treatment (water treatment), water for treatment is passed from the inflow opening 22 to the outflow opening 21. In general, voltage is applied by setting the electrode which is opposed to the cation exchange composition as an anode and the electrode which is opposed to the anion exchange composition as a cathode. However, in a case of use in a region where the hardness of the raw water is comparatively low, it is possible to remove a considerable amount of hard components even when passing treatment water without electrifying the electrodes.

On the other hand, at the time of regeneration of the ion exchange resin (at the time of the regenerating treatment), since water for regeneration is passed from the inflow opening 22 to the outflow opening 21 and, at the same time, voltage of the opposite polarity to that at the time of water softening treatment is applied, voltage is applied by setting the electrode which is opposed to the cation exchange composition as a cathode and the electrode which is opposed to the anion exchange composition as an anode.

Water supplied from the inflow opening 22 to the first rectification member 24 spreads in the horizontal direction while passing through the inside of the first rectification member 24 and is uniformly supplied to the ion exchange membrane laminated body 15.

Regarding the water supplied to the ion exchange membrane laminated body 15, at the time of water softening treatment, hard components (cations) such as magnesium components come into contact with the first cation exchange resin particles 4A and the second cation exchange resin particles 4B which are present in the ion exchange membrane 13 and are adsorbed and removed. In addition, anions such as chloride ions in the water for treatment are adsorbed and removed by the first anion exchange resin particles 6A and the second anion exchange resin particles 6B.

At this time, in the electrochemical cell 10 according to the present exemplary embodiment 1, since the second cation exchange resin particles 4B allow water to permeate more easily than the first cation exchange resin particles 4A, cations are easily adsorbed and removed by the second cation exchange resin particles 4B. In the same manner, since the second anion exchange resin particles 6B allow water to permeate more easily than the first anion exchange resin particles 6A, anions are easily adsorbed and removed by the second anion exchange resin particles 6B.

On the other hand, at the time of the regenerating treatment, a potential difference is generated in the ion exchange membrane 13 and water is dissociated on the interface 13C which is formed of the first cation exchange resin particles 4A of the cation exchange composition 1 of the ion exchange membrane 13 and the first anion exchange resin particles 6A of the anion exchange composition 2. Then, hydrogen ions are generated on a surface of the cathode 12 side, that is, the cation exchange composition 1 side and hydroxide ions are generated on a surface of the anode 11 side, that is, the anion exchange composition 2 side.

In particular, in the electrochemical cell 10 according to the present exemplary embodiment 1, water does not easily permeate the first cation exchange resin particles 4A and the first anion exchange resin particles 6A compared to the second cation exchange resin particles 4B and the second anion exchange resin particles 6B. Therefore, calcium ions or chlorine ions are suppressed from moving through the first cation exchange composition 1A and the first anion exchange composition 2A using water as a medium. Therefore, since the applied voltage is used for water dissociation (H+ and OH−) on the interface 13C, it is possible to improve electric current efficiency due to the water dissociation. In addition, the amount of hydrogen ions which is generated in the first cation exchange resin particles 4A increases and the hydroxide ion amount which is generated in the first anion exchange resin particles 6A increases.

Then, hard components (cations) such as calcium ions and magnesium ions which are adsorbed in the cation exchange composition 1 are desorbed by exchanging ions with the generated hydrogen ions, and the first cation exchange resin particles 4A and the second cation exchange resin particles 4B in the cation exchange composition 1 are regenerated. In addition, anions such as chlorine ions which are adsorbed in the anion exchange composition 2 are desorbed by exchanging ions with generated hydroxide ions, and the first anion exchange resin particles 6A and the second anion exchange resin particles 6B in the anion exchange composition 2 are regenerated.

In particular, in the electrochemical cell 10 according to the present exemplary embodiment 1, water easily permeates the second cation exchange resin particles 4B and the second anion exchange resin particles 6B compared to the first cation exchange resin particles 4A and the first anion exchange resin particles 6A. Due to this, the hydrogen ions which are generated in the first cation exchange resin particles 4A are easily diffused in the second cation exchange resin particles 4B and the hydroxide ions which are generated in the first anion exchange resin particles 6A are easily diffused in the second anion exchange resin particles 6B. Therefore, it is possible to efficiently regenerate the second cation exchange resin particles 4B and the second anion exchange resin particles 6B.

Here, the voltage applied between the anode 11 and the cathode 12 is direct voltage and a voltage of 0 to 300 V is applied at the time of the water softening treatment and a voltage of 10 V to 500 V is applied at the time of regeneration in the present exemplary embodiment; however, the applied voltage is appropriately set according to the number of the ion exchange membranes 13 which are disposed in the casing 20 and the hardness and the like of the water for treatment.

Then, the water which passes through the ion exchange membrane laminated body 15 is supplied to the second rectification member 23. The water supplied to the second rectification member 23 converges toward the outflow opening 21 while passing through the second rectification member 23 and is discharged from the outflow opening 21 to the outside of the electrochemical cell 10. In addition, some of the gas (for example, chlorine, oxygen, and hydrogen) which is generated in the electrode at the time of the water regenerating treatment enters the ion exchange membrane laminated body 15, is pushed by the water, moves in the upward direction, and is discharged from the outflow opening 21 to the outside of the electrochemical cell 10. Here, since the first rectification member 24 and the second rectification member 23 form a communicating structure, the gas is easily discharged. In addition, since the insulation is preserved at the sites other than the ion exchange membrane laminated body which is opposed to the electrode, it is possible to prevent the generation of short pass electric current between sites other than the ion exchange membrane laminated body.

In the electrochemical cell 10 according to the present exemplary embodiment 1 which is formed in this manner, water does not easily permeate the first cation exchange resin particles 4A and the first anion exchange resin particles 6A compared to the second cation exchange resin particles 4B and the second anion exchange resin particles 6B. Due to this, it is possible to sufficiently adsorb hard components by actively adsorbing the hard components in the second cation exchange composition 1B and the second anion exchange composition 2B and it is possible to efficiently regenerate the cation exchange composition 1 and the anion exchange composition 2 by efficiently dissociating water at the interface 13C between the first cation exchange composition 1A and the first anion exchange composition 2A.

In addition, in the electrochemical cell 10 according to the present exemplary embodiment 1, by providing the first sealing member 29 between the inner peripheral surface of the casing 20 and the second rectification member 23, the ion exchange membrane laminated body 15, and the first rectification member 24, it is possible to suppress space from being formed therebetween. Therefore, it is possible to suppress the water supplied from the inflow opening 22 to the casing 20 from passing through the space without passing through the ion exchange membrane laminated body 15 and being discharged from the outflow opening 21, and it is possible to sufficiently execute the water treatment and regenerating treatment.

In addition, in the electrochemical cell 10 according to the present exemplary embodiment 1, the separator 31 is disposed between the anode 11 and the ion exchange membrane laminated body 15 and the separator 32 is disposed between the cathode 12 and the ion exchange membrane laminated body 15. Due to this, heat which is generated when applying voltage between the anode 11 and the cathode 12 is suppressed from being transmitted to the ion exchange membrane laminated body 15. Therefore, it is possible to suppress thermal denaturation of the ion exchange membrane laminated body 15 and to sufficiently execute the water treatment and regenerating treatment.

In addition, in the electrochemical cell 10 according to the present exemplary embodiment 1, since electric current does not flow in the members when the first rectification member 24 and the second rectification member 23 are formed of an insulating material, it is possible to apply electric charge only to the ion exchange membrane laminated body 15, thus it is possible to improve the electric current efficiency.

Furthermore, in the electrochemical cell 10 according to the present exemplary embodiment 1, by arranging the spacer member 14 in a reticular form between the layers of the adjacent ion exchange membranes 13, water which is positioned at the space 14D of the spacer member 14 comes into contact with the second member 14B when moving in the upward direction. Since the second member 14B does not allow water to permeate, the water which comes into contact with the second member 14B easily moves in the front and back direction. Therefore, the water in the space 14D easily permeates to the inside of the ion exchange membrane 13, and it is possible for the water to efficiently come into contact with the ion exchange resin in the ion exchange membrane 13. Therefore, it is possible to efficiently execute the water treatment in the electrochemical cell 10 according to the present exemplary embodiment 1.

Exemplary Embodiment 2

An ion exchange membrane laminated body according to the present exemplary embodiment 2 is an ion exchange membrane laminated body where two or more ion exchange membranes are laminated to oppose each other and is provided with a spacer member which has a communicating structure between front and rear surfaces between the ion exchange membranes. The spacer member is formed in a reticular form by knitting threads of synthetic resin, a portion where the threads intersect is welded, and the front and rear surfaces are smoothly formed.

In addition, an electrochemical cell according to the present exemplary embodiment 2 is further provided with an ion exchange membrane laminated body, electrodes which are disposed such that an anode and a cathode are opposed to each other, and a partitioning board which has water permeability. Furthermore, the ion exchange membrane laminated body is disposed between electrodes, the ion exchange membrane is laminated in a direction orthogonal with respect to a vertical direction, two or more of the ion exchange membrane laminated bodies are disposed to be lined up when viewed from the lamination direction of the ion exchange membrane, and the partitioning board is installed between the ion exchange membrane laminated bodies which are adjacent to each other.

In addition, in the electrochemical cell according to the present exemplary embodiment 2, a casing where an inflow opening of water is provided in a lower section and an outflow opening of water is provided in an upper section and a first rectification member which is disposed between the inflow opening and the ion exchange membrane laminated body which is positioned to be lowest and which is formed in a taper so as to expand from bottom to top when viewed from a lamination direction of the ion exchange membranes may be further provided.

In addition, in the electrochemical cell according to the present exemplary embodiment 2, the first rectification member may have an insulation property.

In addition, in the electrochemical cell according to the present exemplary embodiment 2, a second rectification member, which is disposed between the outflow opening and the ion exchange membrane laminated body which is positioned to be uppermost and which is formed with a taper so as to expand from top to bottom when viewed from a lamination direction of the ion exchange membranes, may be further provided.

In addition, in the electrochemical cell according to the present exemplary embodiment 2, the second rectification member may have an insulation property.

Furthermore, in the electrochemical cell according to the present exemplary embodiment 2, a separator which is formed of a material which has an insulation property, which has a communicating structure between the front and rear surfaces, and which is disposed between the ion exchange membrane laminated body and the electrode may be further provided.

Detailed description will be given below of an example of the electrochemical cell according to the present exemplary embodiment 2 with reference to FIG. 6 and FIG. 7.

[Configuration of Electrochemical Cell]

Figure 6:
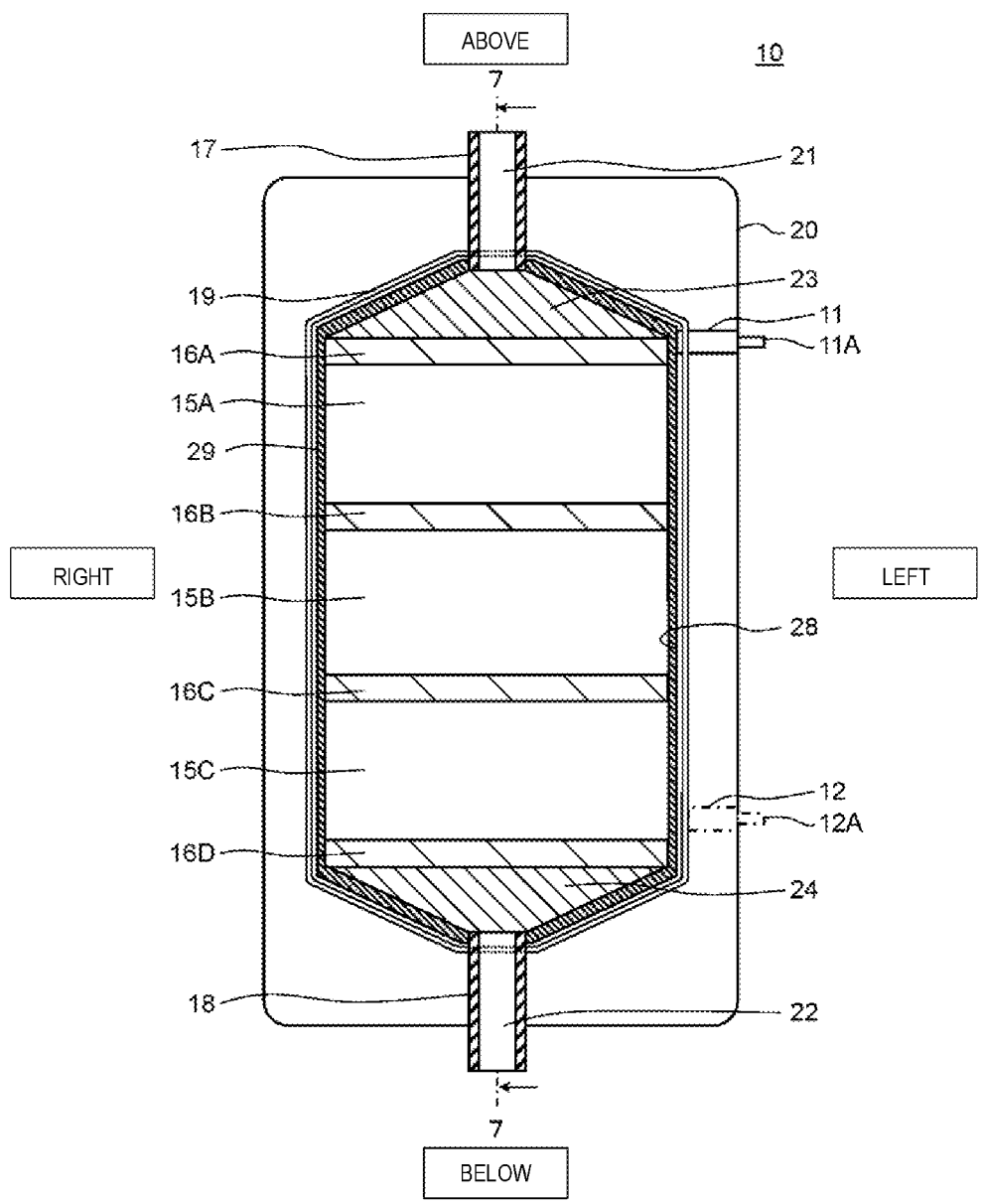
FIG. 6 is a cross-sectional diagram from a front surface direction which shows a schematic configuration of the electrochemical cell according to a present exemplary embodiment 2.

FIG. 6 is a cross-sectional diagram in a front surface direction which shows a schematic configuration of the electrochemical cell according to the present exemplary embodiment 2. FIG. 7 is a cross-sectional diagram of the electrochemical cell along the line 7-7 shown in FIG. 6. Here, in FIG. 6 and FIG. 7, the vertical direction, the horizontal direction, and the front and back direction of the electrochemical cell are represented as the vertical direction, the horizontal direction, and the front and back direction in the diagrams.

Figure 7:
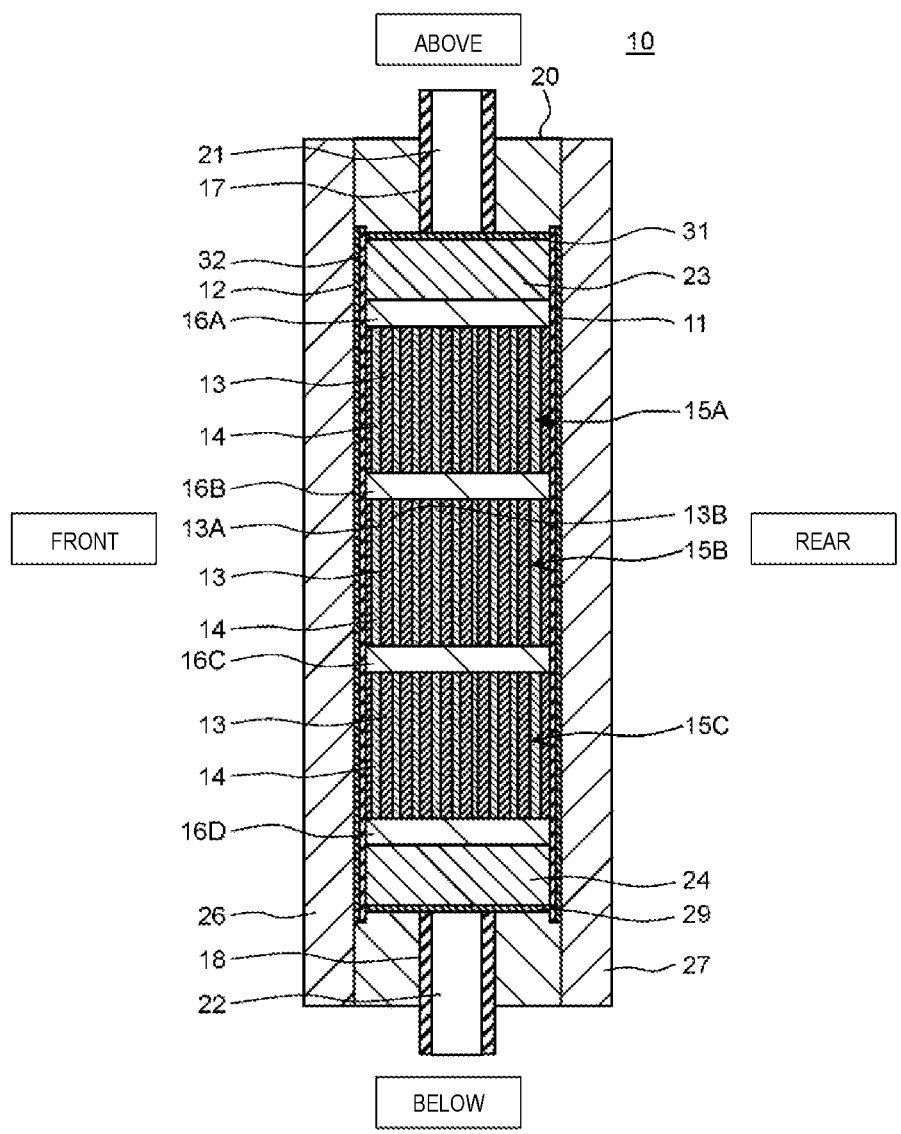
FIG. 7 is a cross-sectional diagram of the electrochemical cell along a line 7-7 shown in FIG. 6.

As shown in FIG. 6 and FIG. 7, the basic configuration of the electrochemical cell 10 according to the present exemplary embodiment 2 is the same as that of the electrochemical cell 10 according to exemplary embodiment 1; however, the point that three ion exchange membrane laminated bodies 15A, 15B, and 15C and partitioning boards 16A, 16B, 16C, and 16D are further provided is different.

In detail, the first rectification member 24, the partitioning board 16D, the ion exchange membrane laminated body 15C, the partitioning board 16C, the ion exchange membrane laminated body 15B, the partitioning board 16B, the ion exchange membrane laminated body 15A, the partitioning board 16A, and the second rectification member 23 are installed in order from the bottom in the through hole 28 of the casing 20 and the above members are formed so as to fit into the through hole 28.

In other words, when viewed from the normal direction of the main surface of the casing 20, the first rectification member 24 is disposed between the inflow opening 22 and the ion exchange membrane laminated body 15C which is positioned to be lowest, and the second rectification member 23 is disposed between the outflow opening 21 and the ion exchange membrane laminated body 15A which is positioned to be uppermost. In addition, the partitioning board 16D is disposed between the first rectification member 24 and the ion exchange membrane laminated body 15C and the partitioning board 16A is disposed between the second rectification member 23 and the ion exchange membrane laminated body 15A.

Then, the ion exchange membrane laminated body 15B is disposed between the ion exchange membrane laminated body 15A and the ion exchange membrane laminated body 15C. The partitioning board 16B is disposed between the ion exchange membrane laminated body 15A and the ion exchange membrane laminated body 15B and the partitioning board 16C is disposed between the ion exchange membrane laminated body 15B and the ion exchange membrane laminated body 15C.

Here, a form is adopted in which the partitioning board 16A and the partitioning board 16D are disposed in the present exemplary embodiment 2; however, without being limited thereto, a form may be adopted in which at least one of the partitioning board 16A and the partitioning board 16D is not disposed. In addition, a form may be adopted in which three of the ion exchange membrane laminated bodies 15 are disposed in the present exemplary embodiment 2; however, the present invention is not limited thereto. It is possible to set the number of the ion exchange membrane laminated bodies which are disposed in the casing 20 to be any number according to the size of the casing 20, the performance of the ion exchange membranes which are laminated on the ion exchange membrane laminated body, the number of laminated layers of the ion exchange membranes, and the like.

The first rectification member 24 is formed with a taper (that is, a trapezoid form) so as to expand from bottom to top when viewed from the normal direction of the main surface of the casing 20.

From the point of view of mixing the water supplied from the first rectification member 24 to the partitioning board 16D, the partitioning board 16D may be formed of a porous material. In addition, from the point of view that electric current flows in the water which passes through the ion exchange membrane laminated bodies 15A, 15B, and 15C and electric current is not leaked to the other portions, the partitioning board 16D may be formed of an insulating material. Furthermore, from the point of view of supporting the ion exchange membrane laminated body 15C, the partitioning board 16D may be formed to have a predetermined rigidity.

As the material which forms the partitioning board 16D, polyethylene resin, polypropylene resin, acryl resin, and the like may be used. In the present exemplary embodiment 2, the partitioning board 16D is formed of an acryl board provided with a plurality of through holes which extend in the vertical direction. Here, since the partitioning boards 16A, 16B, and 16C are each formed in the same manner as the partitioning board 16D, detailed description thereof will be omitted.

The second rectification member 23 is formed with a taper (that is, a trapezoid form) so as to expand from top to bottom when viewed from the normal direction (the lamination direction of the ion exchange membrane 13) of the main surface of the casing 20. In other words, the second rectification member 23 is formed so as to converge to the outflow opening 21 when viewed from the passing direction of water.

In addition, the ion exchange membrane laminated bodies 15A, 15B, and 15C are each provided with two or more of the ion exchange membranes 13 and the reticular spacer member 14. Here, since the spacer member 14 is formed in the same manner as the spacer member 14 shown in FIG. 5, detailed description thereof will be omitted. In addition, the ion exchange membranes 13 with which each of the ion exchange membrane laminated bodies 15A, 15B, and 15C are provided may have the same configuration or may have a different configuration.

Here, description will be given of an example of the ion exchange membranes 13 with which the ion exchange membrane laminated bodies 15A, 15B, and 15C are provided in the electrochemical cell 10 according to the present exemplary embodiment 2 with reference to FIG. 8.

Figure 8:
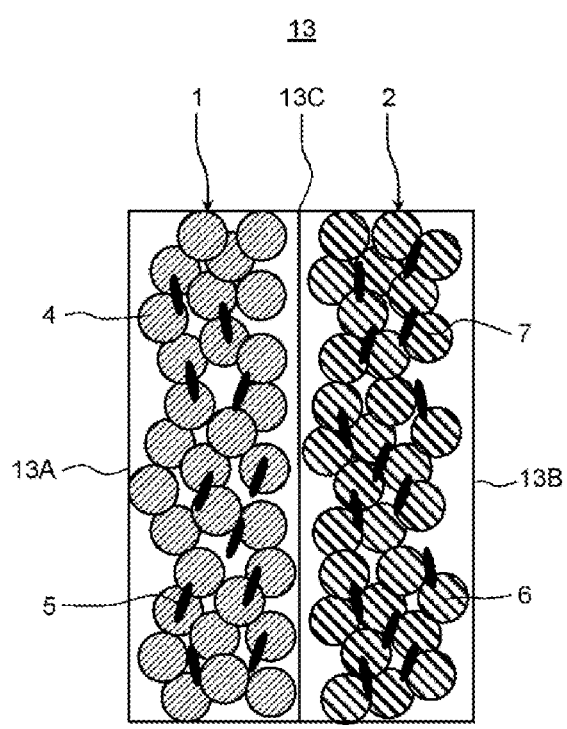
FIG. 8 is a schematic diagram which shows an example of an ion exchange membrane of the electrochemical cell according to the present exemplary embodiment 2.

FIG. 8 is a schematic diagram which shows an example of an ion exchange membrane of the electrochemical cell according to the present exemplary embodiment 2.

Here, in exemplary embodiment 1 described above, the first cation exchange composition 1A and the first anion exchange composition 2A are laminated such that the main surfaces thereof are opposed to (in contact with) each other, and the first cation exchange composition 1A and the second cation exchange composition 1B are laminated such that the main surfaces thereof are opposed to (in contact with) each other. In the same manner, the first anion exchange composition 2A and the second anion exchange composition 2B are laminated such that the main surfaces thereof are opposed to (in contact with) each other.

The first cation exchange composition 1A is formed so as not to allow water to easily permeate compared to the second cation exchange composition 1B. In addition, the first anion exchange composition 2A is formed so as not to allow water to easily permeate compared to the second anion exchange composition 2B. That is, in exemplary embodiment 1, an ion exchange membrane with a four-layer structure of the first cation exchange composition 1A, the second cation exchange composition 1B, the first anion exchange composition 2A, and the second anion exchange composition 2B is used. The ion exchange membrane laminated body is formed by laminating the ion exchange membranes of the four-layer structure.

However, in the present exemplary embodiment 2, as shown in FIG. 8, the ion exchange membrane 13 is provided with the cation exchange composition 1 and the anion exchange composition 2. The cation exchange composition 1 and the anion exchange composition 2 are laminated such that the main surfaces thereof are opposed to (in contact with) each other and the main surfaces which are in contact are bonded. The interface 13C is formed at the bonding surface of the cation exchange composition 1 and the anion exchange composition 2. In addition, the cation exchange surface 13A is formed on the main surface on the cation exchange composition 1 side of the ion exchange membrane 13 and the anion exchange surface 13B is formed on the main surface on the anion exchange composition 2 side. That is, the ion exchange membrane 13 with a two-layer structure of the cation exchange composition 1 and the anion exchange composition 2 is used. In the present exemplary embodiment 2, the ion exchange membrane laminated body is formed by laminating the ion exchange membranes 13 with the two-layer structure.

The cation exchange composition 1 has cation exchange resin particles 4 and first binder resin particles 5. In addition, the anion exchange composition 2 has anion exchange resin particles 6 and second binder resin particles 7.

A strongly acidic cation exchange resin which has an exchange group —$SO_3H$ may be used as the cation exchange resin particles 4 and a strongly basic anion exchange resin which has an exchange group —$NR_3OH$ may be used as the anion exchange resin particles 6. Here, as will be described below, in a case of applying a voltage to the ion exchange membrane 13, a weakly acidic cation exchange resin which has an exchange group —RCOOH may be used as the cation exchange resin particles 4. A weakly basic anion exchange resin which has —NR2 may be used as the anion exchange composition 2. Furthermore, a weakly acidic cation exchange resin which has an exchange group —RCOOH may be used as the cation exchange resin particles 4 and a strongly basic anion exchange resin which has —$NR_3OH$ may be used as the anion exchange composition 2. Since the adsorption capacity is increased in a combination of a weakly acidic cation exchange resin and a strongly basic anion exchange resin, it is possible to increase the water softening treatment amount and water dissociation at the time of regeneration is further improved.

The first binder resin particles 5 and the second binder resin particles 7 may be formed in the same manner as the first binder resin particles 5A and the like of the ion exchange membrane 13 according to exemplary embodiment 1, or may be formed of thermoplastic resin particles. As the thermoplastic resin, it is possible to use polyolefin resin, for example, polyethylene, polypropylene, ethylene-propylene copolymer, ethylene-vinyl acetate copolymer, ethylene-acrylic acid copolymer, and the like. Here, for the thermoplastic resin particles which configure the first binder resin particles 5 and the thermoplastic resin particles which configure the second binder resin particles 7, the same type of thermoplastic resin may be used, or a different type of thermoplastic resin may be used.

Here, for the ion exchange membrane 13 of the electrochemical cell 10 according to the present exemplary embodiment 2, it is possible to use various types of ion exchange membranes which are known in the art without being limited to the configuration described above and it is also possible to use methods which are known in the art as the manufacturing method thereof. For example, the ion exchange membrane (porous ion exchange body) disclosed in WO2012/039127 may be used.

In addition, the ion exchange membrane 13 of the electrochemical cell 10 according to the present exemplary embodiment 2 may be formed in the same manner as the electrochemical cell 10 according to exemplary embodiment 1. Furthermore, the cation exchange composition 1 and the anion exchange composition 2 in the ion exchange membrane 13 of the electrochemical cell 10 according to the present exemplary embodiment 2 may be formed of the first cation exchange composition 1A and the first anion exchange composition 2A of the electrochemical cell 10 of exemplary embodiment 1. The cation exchange composition 1 and the anion exchange composition 2 may be formed of the first cation exchange composition 1A and the second anion exchange composition 2B. The cation exchange composition 1 and the anion exchange composition 2 may be formed of the second cation exchange composition 1B and the first anion exchange composition 2A. The cation exchange composition 1 and the anion exchange composition 2 may be formed of the second cation exchange composition 1B and the second anion exchange composition 2B.

Here, the cation exchange composition 1 and the anion exchange composition 2 in the ion exchange membrane 13 of the electrochemical cell 10 according to the present exemplary embodiment 2 are formed by affixing the second cation exchange composition 1B which has water permeability in exemplary embodiment 1 and the second anion exchange composition 2B which has water permeability. Also, in a case where the second cation exchange composition 1B is formed of a weakly acidic cation exchange resin and the second anion exchange composition 2B is formed of a strongly basic anion exchange resin, it is possible to increase the ion exchange capacity and the water softening treatment amount is increased. Moreover, it is considered that resistance of a membrane is low in a combination of a weakly acidic cation exchange resin and a strongly basic anion exchange resin and the strongly basic group has a catalytic action of water dissociation.

Therefore, the electric potential difference is large at the interface 13C of the ion exchange membrane 13 and it is possible to promote water dissociation. Therefore, it is possible to sufficiently regenerate the ion exchange membrane 13.

[Effects of Electrochemical Cell]

The electrochemical cell 10 according to the present exemplary embodiment 2 which is formed in this manner also exhibits the same operation and effects as the electrochemical cell 10 of exemplary embodiment 1.

In addition, in the electrochemical cell 10 according to the present exemplary embodiment 2, by arranging a plurality of ion exchange membrane laminated bodies to be lined up and arranging a partitioning board between the adjacent ion exchange membrane laminated bodies when viewed from the lamination direction of the ion exchange membrane 13, it is possible to suppress the ion exchange membrane 13 from dangling downward under its own weight. Due to this, it is possible to suppress pressure loss in the water which passes through the casing 20 from being large and it is possible for water to uniformly pass through the entire casing 20. In addition, since water uniformly passes through the entire casing 20, it is possible to efficiently adsorb and remove each of the ions such as hard components at the time of water softening treatment and it is possible to increase the regeneration efficiency at the time of the regenerating treatment.

In addition, in the electrochemical cell 10 according to the present exemplary embodiment 2, even when the water flow is non-uniform in a part of the ion exchange membrane laminated body, it is possible to make the water flow uniform while passing the partitioning board and to efficiently execute the water treatment.

Exemplary Embodiment 3

An electrochemical cell according to the present exemplary embodiment 3 is provided with the ion exchange membrane laminated body described in exemplary embodiment 1 or 2 and a cylindrical core material. Furthermore, the ion exchange membrane laminated body is wound on the outer peripheral surface of the core material such that an end of the ion exchange membrane and an end of the spacer member are shifted and the end of the spacer member is exposed between the ends of the two layers of the ion exchange membranes when viewed from the lamination direction of the ion exchange membranes.

In addition, the electrochemical cell according to exemplary embodiment 3 may be further provided with a cylindrical casing where an inflow opening is provided in a lower section and an outflow pipe which is disposed inside the core material such that the upstream end is positioned above the inflow opening.

Furthermore, the electrochemical cell according to exemplary embodiment 3 may be further provided with an inflow pipe which is disposed in the inflow opening so as to be inclined in a direction other than a direction orthogonal with respect to a tangential line of an inner peripheral surface of the casing.

Detailed description will be given below of an example of the electrochemical cell according to exemplary embodiment 3 with reference to FIG. 9 to FIG. 11B.

[Structure of Electrochemical Cell]

Figure 9:
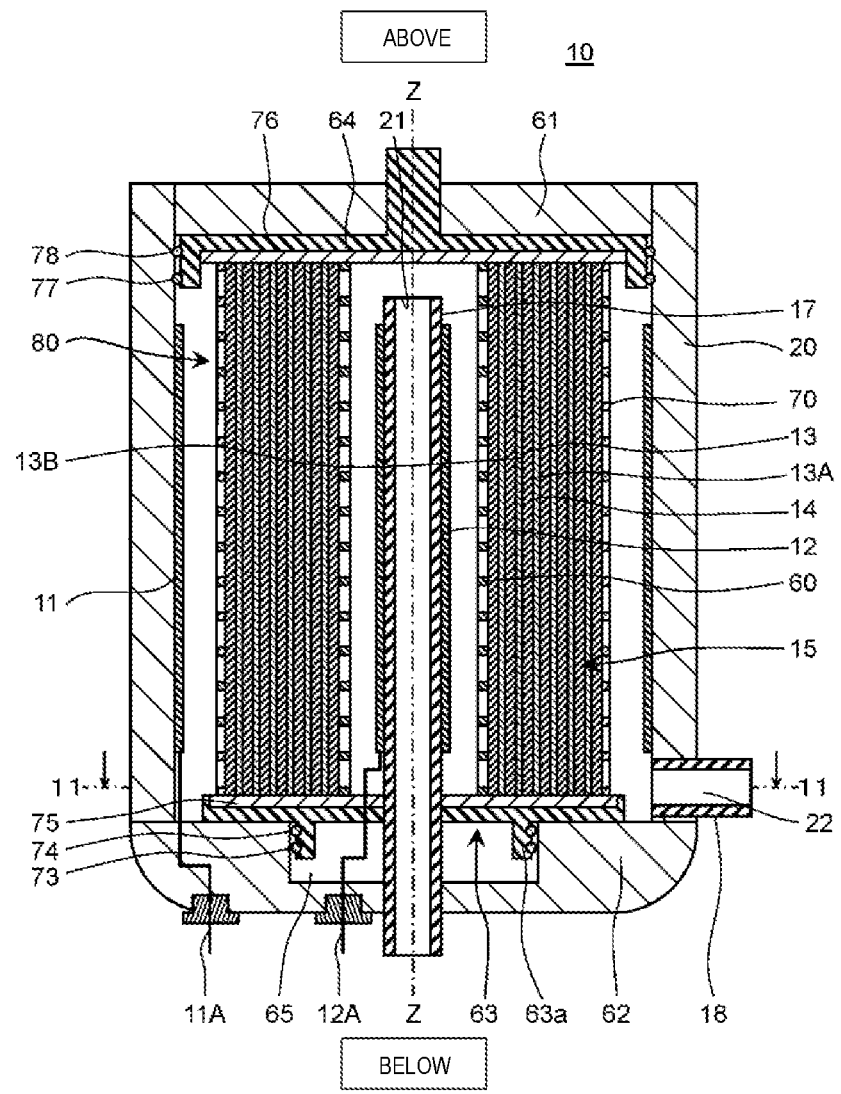
FIG. 9 is a cross-sectional diagram which shows a schematic configuration of an electrochemical cell according to a present exemplary embodiment 3.
Figure 10:
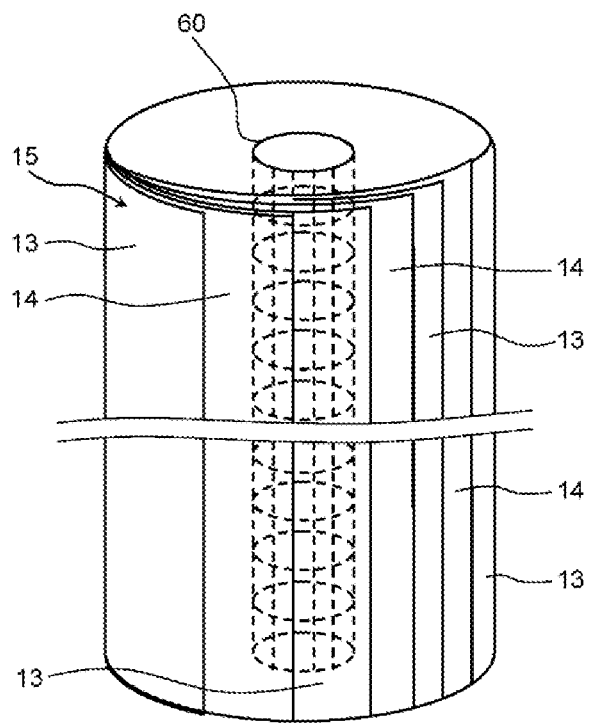
FIG. 10 is a perspective diagram which shows a schematic configuration of a membrane module of the electrochemical cell shown in FIG. 9.
Figure 11A:
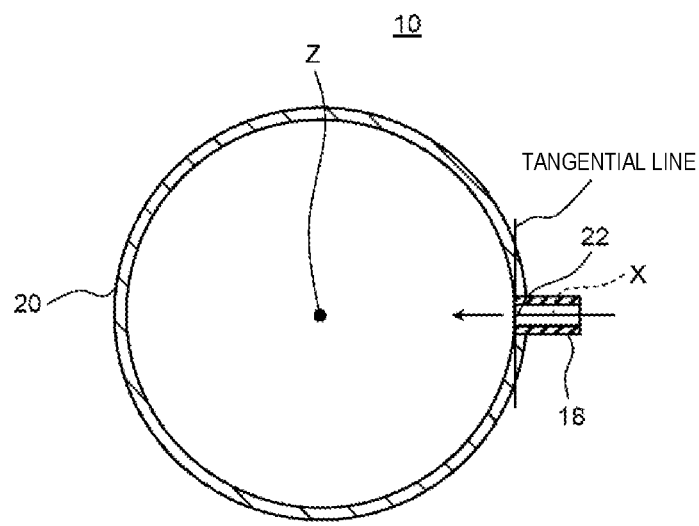
FIG. 11A is a cross-sectional diagram along a line 11-11 shown in FIG. 9.
Figure 11B:
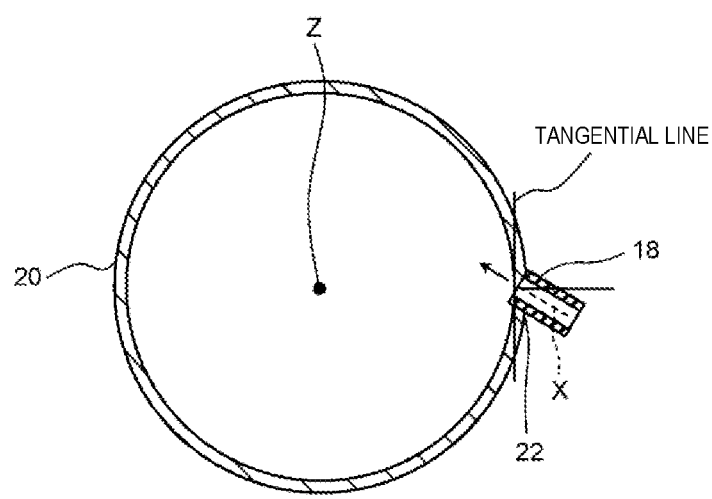
FIG. 11B is a cross-sectional diagram along a line 11-11 shown in FIG. 9.

FIG. 9 is a cross-sectional diagram which shows a schematic configuration of the electrochemical cell according to the present exemplary embodiment 3. FIG. 10 is a perspective diagram which shows a schematic configuration of a membrane module of the electrochemical cell shown in FIG. 9. FIG. 11A and FIG. 11B are cross-sectional diagrams taken along a line 11-11 shown in FIG. 9 and FIG. 11A shows a comparative example and FIG. 11B shows an example of the present exemplary embodiment 3.

Here, in FIG. 9, the vertical direction of the electrochemical cell is represented as the vertical direction in the diagram. In FIG. 10, description of a fourth lid member 64 which forms the upper surface of the membrane module and a third lid member 63 which forms the lower surface and description of the central portion are omitted. In addition, in FIG. 11A and FIG. 11B, a configuration such as the membrane module is omitted.

As shown in FIG. 9, the electrochemical cell 10 according to the present exemplary embodiment 3 is provided with a cylindrical outflow pipe 17, a membrane module 80 which has a cylindrical core material 60, an ion exchange membrane laminated body 15, the third lid member 63, and the fourth lid member 64, and the cylindrical casing 20. Then, the outflow pipe 17 and the cylindrical membrane module 80 are disposed in the inner space of the casing 20. Here, in the present exemplary embodiment 3, the outflow pipe 17, the core material 60 (the membrane module 80), and the casing 20 are coaxially disposed. In addition, for the ion exchange membrane laminated body 15, the ion exchange membrane laminated body 15 described in exemplary embodiment 1 may be used, or the ion exchange membrane laminated body 15 described in exemplary embodiment 2 may be used.

Firstly, description will be given of the membrane module 80 with reference to FIG. 9 and FIG. 10.

The peripheral surface of the core material 60 is formed in a mesh form and the ion exchange membrane laminated body 15 is wound on the outer peripheral surface thereof. In detail, when viewed from the lamination direction (the diameter direction of the membrane module 80) of the ion exchange membrane 13 (the ion exchange membrane laminated body 15), the ion exchange membrane 13 and the spacer member 14 are wound on the outer peripheral surface of the core material 60 such that each of the outer ends is shifted.

In more detail, the ion exchange membrane 13 and the spacer member 14 are formed in a rectangular form and are formed to have main surfaces which are the same size as each other. The ion exchange membrane 13 and the spacer member 14 are fixed on the outer peripheral surface of the core material 60 such that one side (the inner end) of each extending in the vertical direction is shifted from the other. Then, by laminating and winding a plurality of the ion exchange membranes 13 and the spacer members 14 along the outer peripheral surface of the core material 60, the ion exchange membrane 13 and the spacer member 14 are installed such that each of the outer ends is shifted and the outer end of the spacer member 14 is exposed between the outer ends of the two layers of the ion exchange membranes 13.

In addition, as shown in FIG. 9, a cylindrical fixing member 70 for fixing the ion exchange membrane 13 and the spacer member 14 is disposed on the outer peripheral surface of the membrane module 80. The peripheral surface of the fixing member 70 is formed in a mesh form.

The lower surface of the membrane module 80 is formed of the third lid member 63. In addition, the upper surface of the membrane module 80 is formed of the fourth lid member 64. A fifth sealing member 75 is mounted on the upper surface of the third lid member 63. The fifth sealing member 75 fixes the core material 60 and the ion exchange membrane laminated body 15 which is wound around the core material 60 from the lower surface. In addition, a sixth sealing member 76 is mounted on the lower surface of the fourth lid member 64. The sixth sealing member 76 fixes the core material 60 and the ion exchange membrane laminated body 15 which is wound around the core material 60 from the upper surface.

The core material 60, the ion exchange membrane laminated body 15 which is wound around the core material 60, the third lid member 63, and the fourth lid member 64 are integrated to configure the membrane module 80. Due to this, it is possible to easily attach and detach the membrane module 80 from the casing 20.

Next, description will be given of the other configuration of the membrane module 80 and the electrochemical cell 10 with reference to FIG. 9.

As shown in FIG. 9, a disk-shaped first lid member 61 is disposed on the upper end of the casing 20 and a disk-shaped second lid member 62 is disposed on the lower end of the casing 20. The first lid member 61 is fixed by the circumference surface of the first lid member 61 and the inner peripheral surface of the casing 20 being screwed together and the second lid member 62 is fixed to the casing 20 by an appropriate means. Here, the casing 20 and the second lid member 62 may be integrally configured.

A through hole 65 in a step form is provided in the main surface of the second lid member 62 such that the opening in the lower surface is smaller than the opening in the upper surface. Here, the through hole 65 is provided so as to be on the same axis as the axis center Z of the casing 20.

The disk-shaped third lid member 63 is mounted on the upper surface of the second lid member 62. A circular protrusion 63a is provided on the lower surface of the third lid member 63. A third sealing member 73 and a fourth sealing member 74 are disposed between the outer peripheral surface of the protrusion 63a and the upper side inner peripheral surface of the second lid member 62 where the through hole 65 is formed. As the third sealing member 73 and the fourth sealing member 74, for example, an 0 ring or the like may be used.

In addition, a recessed portion is provided in the upper surface of the third lid member 63 and the fifth sealing member 75 in a board form is mounted on the recessed portion. As the fifth sealing member 75, for example, a hot melt material or a urethane-based potting material may be used. Here, a hot melt material which is quickly cured is desirably used from the point of view of productivity. A polyolefin-based material is desirably used as the hot melt material from the point of view of hydrolysis resistance.

A through hole is provided in each of the main surface of the third lid member 63 and the main surface of the fifth sealing member 75 so as to be on the same axis as the axis center Z of the casing 20. Then, the outflow pipe 17 is installed so as to fit into these through holes and the through hole 65 of the second lid member 62 and pass through the inner space of the core material 60.

The outflow pipe 17 is formed such that the upstream end (the upper end in FIG. 9) thereof forms the outflow opening 21 and the outflow opening 21 is positioned above the inflow opening 22. Here, the outflow pipe 17 may be extended to the vicinity of the upper end of the casing 20. In addition, the outflow pipe 17 is a part of a pipe which forms the first water flow path 17.

The cathode 12 in a board form is provided so as to be wound on the outer peripheral surface of the outflow pipe 17. The cathode 12 is electrically connected to the terminal 12A by appropriate wiring. Here, the cathode 12 is formed in a board form in the present exemplary embodiment 3, but may be formed in a wire form without being limited thereto.

On the other hand, the anode 11 is provided so as to be wound on the inner peripheral surface of the casing 20 and is formed in a board form here. The anode 11 is electrically connected to the terminal 11A by appropriate wiring. Here, the anode 11 is formed in a board form in the present exemplary embodiment 3, but may be formed in a wire form without being limited thereto.

The fourth lid member 64 (membrane module) in a board form is attached to the first lid member 61 by an appropriate means. In the present exemplary embodiment 3, a through hole is provided in the main surface of the first lid member 61 and the fourth lid member 64 is fixed to the first lid member 61 by fitting with a projection portion provided in the upper surface of the fourth lid member 64.

The membrane module 80 is fixed to the casing 20 by the first lid member 61 pressurizing the membrane module 80.

A recessed portion is formed on the lower surface of the fourth lid member 64 and the sixth sealing member 76 in a board form is mounted on the recessed portion. As the sixth sealing member 76, for example, a hot melt material or a urethane-based potting material may be used. Here, a hot melt material which is quickly cured is desirably used from the point of view of productivity. A polyolefin-based material is desirably used as the hot melt material from the point of view of hydrolysis resistance.

In addition, a seventh sealing member 77 and an eighth sealing member 78 are disposed between the outer peripheral surface of the fourth lid member 64 and the inner peripheral surface of the casing 20. As the seventh sealing member 77 and the eighth sealing member 78, for example, an 0 ring and the like may be used.

In addition, a through hole is provided in the lower section of the casing 20 and the through hole forms the inflow opening 22. Here, the inflow opening 22 may be provided in the lower end of the casing 20.

The inflow pipe 18 is connected to the inflow opening 22 so as to be inclined in a direction other than a direction orthogonal with respect to a tangential line of the inner peripheral surface of the casing 20. Here, the inflow pipe 18 forms the third water flow path 18.

Here, detailed description will be given of a structure of the inflow pipe 18 with reference to FIG. 11A and FIG. 11B.

As shown in FIG. 11A, in a case of providing the inflow pipe 18 such that the center axis X of the inflow pipe 18 is positioned in a direction orthogonal with respect to the tangential line of the inner peripheral surface of the casing 20, the water which passed through the inflow pipe 18 easily flows in the diameter direction from the inflow opening 22 toward the axis center Z of the casing 20.

On the other hand, as shown in FIG. 11B, in a case of providing the inflow pipe 18 such that the center axis X of the inflow pipe 18 is positioned in a direction other than a direction orthogonal with respect to a tangential line of the inner peripheral surface of the casing 20, the water which passed through the inflow pipe 18 easily flows from the inflow opening 22 in the circumferential direction of the casing 20. Due to this, water easily permeates to the inside of the ion exchange membrane 13 and it is possible to efficiently come into contact with the ion exchange resin in the ion exchange membrane 13.

Therefore, the inflow pipe 18 may be disposed such that the angle α between the center axis X of the inflow pipe 18 and a tangential line of the inner peripheral surface of the casing 20 is 0° or more and less than 90°. The inflow pipe 18 may be disposed such that the angle α is 60° or less, may be disposed such that the angle α is 45° or less, and may be disposed such that the angle α is 30° or less.

Here, the inflow pipe 18 may be disposed such that the angle β between the center axis X of the inflow pipe 18 and the axis center Z of the casing 20 is more than 0° and less than 90° such that the inflow opening 22 faces upward. In addition, a plurality of the inflow pipes 18 may be provided.

In addition, the inflow pipe 18 may be formed by providing a guide member in a spiral form on the inner peripheral surface of the casing 20 such that water passes through the inside of the casing 20 in a spiral form.

[Effects of Electrochemical Cell]

Since the ion exchange membrane laminated body 15 described in exemplary embodiment 1 or the ion exchange membrane laminated body 15 described in exemplary embodiment 2 is provided in the electrochemical cell 10 according to the present exemplary embodiment 3 which is formed in this manner, the same effects as the electrochemical cell 10 according to exemplary embodiment 1 or 2 are exhibited.

In addition, in the electrochemical cell 10 according to the present exemplary embodiment 3, since the ion exchange membrane laminated body 15 is wound around the outer peripheral surface of the core material 60 such that the end of the ion exchange membrane 13 and the end of the spacer member 14 are shifted when viewed from the lamination direction of the ion exchange membrane 13, the configuration is made such that the ion exchange membranes 13 do not come into contact with each other in a wound state. Therefore, it is possible for water to pass between the ion exchange membranes 13 smoothly and thoroughly.

Due to this, it is possible to efficiently adsorb and remove each of the ions such as hard components at the time of water softening treatment and it is possible to increase the regeneration efficiency at the time of regenerating treatment.

In addition, in the electrochemical cell 10 according to the present exemplary embodiment 3, since the upstream end of the outflow pipe 17 is disposed so as to be positioned above the inflow opening 22, it is possible to increase the contact time with the ion exchange membrane 13 until the water which flows into the casing 20 flows into the outflow opening 21 of the outflow pipe 17. Due to this, it is possible to efficiently adsorb and remove each of the ions such as hard components at the time of water softening treatment and it is possible to increase the regeneration efficiency at the time of regenerating treatment.

Furthermore, in the electrochemical cell 10 according to the present exemplary embodiment 3, since the inflow pipe 18 is connected so as to be inclined in a direction other than a direction orthogonal with respect to a tangential line of the inner peripheral surface of the casing 20, the water which flows into the casing 20 easily flows in the circumferential direction of the casing 20.

Therefore, a spiral flow is easily formed inside the casing 20. Due to this, water easily circulates thoroughly in the casing 20 and it is possible for the water and the ion exchange membrane 13 to favorably come into contact. Therefore, it is possible to efficiently adsorb and remove each of the ions such as hard components at the time of water softening treatment and it is possible to increase the regeneration efficiency at the time of regenerating treatment.

Here, from the point of view of making it easier for water to flow into the ion exchange membrane 13, the inflow pipe 18 may be disposed such that, regarding the inclined direction thereof, the direction in which water circulates in the casing 20 and the direction in which the ion exchange membrane laminated body 15 is wound around the core material 60 are opposite to each other.

That is, in a case where the ion exchange membrane laminated body 15 is wound clockwise around the core material 60 when viewed from the upper surface of the membrane module 80, the direction in which water circulates in the casing 20 is preferably counterclockwise. In addition, in a case where the ion exchange membrane laminated body 15 is wound counterclockwise around the core material 60 when viewed from the upper surface of the membrane module 80, the direction in which water circulates in the casing 20 is preferably clockwise.

Exemplary Embodiment 4

A water treatment apparatus according to the present exemplary embodiment 4 is provided with the electrochemical cell according to any of exemplary embodiment 1 to exemplary embodiment 3, a power source which supplies electrical power to electrodes, a first water flow path which is connected to an outflow opening, which has a water intake opening, and through which water passes, a second water flow path which is branched from the first water flow path and has a water drainage opening, a flow path switching device which switches flow of water to the water intake opening or the water drainage opening, and a controller which controls the power source and the flow path switching device.

In addition, in the water treatment apparatus according to the present exemplary embodiment 4, a third water flow path which is connected to the inflow opening and a barrier filter which is provided in the third water flow path may be further provided.

In addition, the water treatment apparatus according to the present exemplary embodiment 4 may further include a scale suppressing agent provided in the third water flow path.

In addition, in the water treatment apparatus according to the present exemplary embodiment 4, the controller may, after regenerating treatment of the cation exchange group and the anion exchange group, when executing the water softening treatment, after stopping power supply to the electrodes for a predetermined time, the water softening treatment may be executed by supplying electric power from the power source to the electrodes so as to switch the polarity of the electrodes.

Furthermore, in the water treatment apparatus according to the present exemplary embodiment 4, the controller may control the power source to gradually increase the electric power supplied to the electrode when executing the regenerating treatment of the cation exchange group and the anion exchange group.

Description will be given below of an example of the water treatment apparatus according to the present exemplary embodiment 4 with reference to FIG. 12.

[Configuration of Water Treatment Apparatus]

Figure 12:
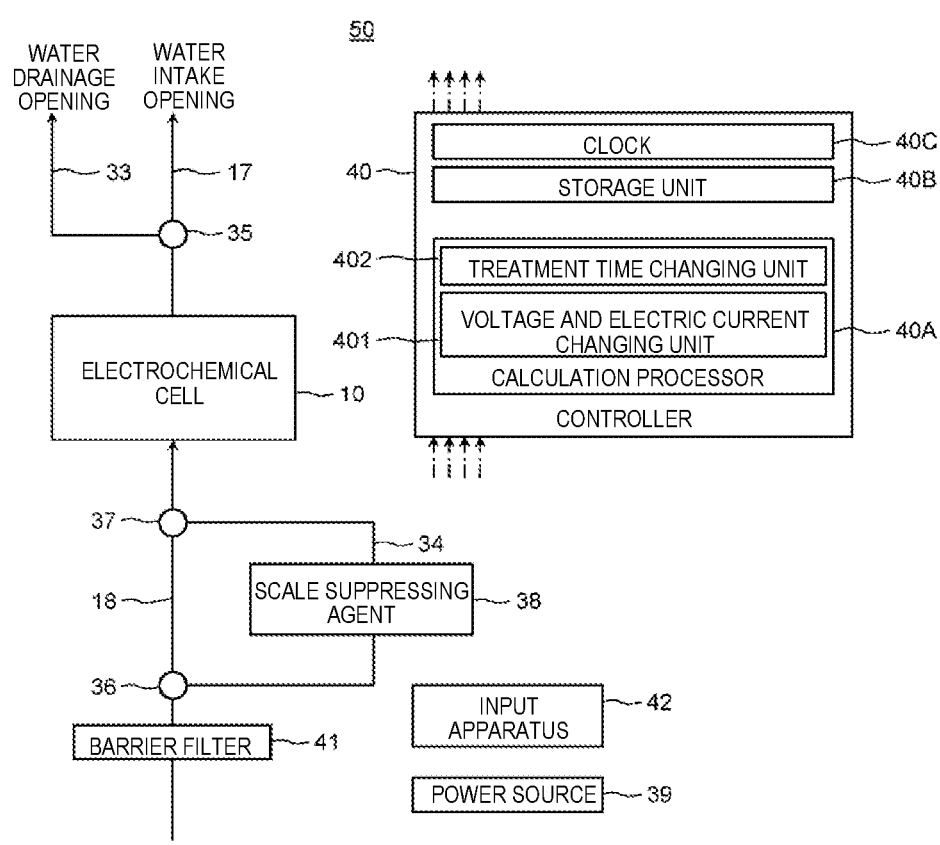
FIG. 12 is a schematic diagram which shows a schematic configuration of a water treatment apparatus according to a present exemplary embodiment 4.

FIG. 12 is a schematic diagram which shows a schematic configuration of a water treatment apparatus according to the present exemplary embodiment 4.

As shown in FIG. 12, a water treatment apparatus 50 according to the present exemplary embodiment 4 is provided with the electrochemical cell 10 according to exemplary embodiment 1, a power source 39, a first water flow path 17, a second water flow path 33, a third water flow path 18, a first switching valve 35, a scale suppressing agent 38, an input apparatus 42, and a controller 40.

As described above, the upstream end of the first water flow path 17 is connected to the outflow opening 21 of the electrochemical cell 10 and the downstream end of the first water flow path 17 forms a water intake opening. In addition, the upstream end of the second water flow path 33 is connected mid-way to the first water flow path 17 and the downstream end of the second water flow path 33 forms a water drainage opening.

Furthermore, the first switching valve 35 is provided at a connecting point of the first water flow path 17 and the second water flow path 33 as a flow path switching device. The first switching valve 35 is formed so as to switch to supply water which passes through the first water flow path 17 to a water intake opening, or to supply the water to a water drainage opening by passing through the second water flow path 33. As the first switching valve 35, it is possible to use, for example, a three-way valve or the like.

Here, a form is adopted in which the first switching valve 35 is used as a flow path switching device in the water treatment apparatus 50 according to the present exemplary embodiment 4; however, the present invention is not limited thereto. For example, a form may be adopted for functioning as a flow path switching device by providing a two-way valve in each of the second water flow path 33 and the first water flow path 17 which is on the downstream side of the connecting point of the second water flow path 33, and the controller 40 switching each of the two-way valves to open and closed.

In addition, the third water flow path 18 is connected to the inflow opening 22 of the electrochemical cell 10. The fourth water flow path 34 is connected mid-way to the third water flow path 18 and a second switching valve 36 is provided in a portion to which the upstream end of the fourth water flow path 34 of the third water flow path 18 is connected. In addition, a third switching valve 37 is provided in a portion to which the downstream end of the fourth water flow path 34 of the third water flow path 18 is connected.

The second switching valve 36 and the third switching valve 37 are formed so as to switch whether or not water which passes through the third water flow path 18 passes through the fourth water flow path 34. As the second switching valve 36 and the third switching valve 37, it is possible to use, for example, a three-way valve and the like.

In addition, a barrier filter 41 is provided mid-way in the third water flow path 18 and the scale suppressing agent 38 is provided mid-way in the fourth water flow path 34. The scale suppressing agent 38 may be in any form as long as it is possible to suppress precipitation of the scale or remove the precipitated scale.

As the scale suppressing agent 38, for example, when using polyphosphate salt, the polyphosphate salt is removed when the water is passed through the scale suppressing agent 38 and it is possible to suppress $CaCO_3$ from being precipitated to the membrane surface of the electrochemical cell 10, the third switching valve 37, or the first water flow path 17. In addition, as the scale suppressing agent 38, when using citric acid, even when scale is precipitated to the inside of the electrochemical cell 10, the third switching valve 37, or the first water flow path 17, it is possible to remove the scale and suppress scale fixing.

As the barrier filter 41, for example, by using a micro filter with a hole diameter of approximately 0.3 μm to 10 μm, it is possible to prevent foreign matter from entering inside the electrochemical cell 10. Since the barrier filter 41 is also able to suppress red water which includes iron salt and the like from being introduced downstream of the barrier filter 41, it is possible to suppress precipitation of the iron salt and the like on the membrane surface inside the electrochemical cell 10 and it is possible to improve the durability of the membrane itself.

Here, a form is adopted in which the barrier filter 41 is disposed on the upstream side of the second switching valve 36 in the present exemplary embodiment 4; however, the present invention is not limited thereto. For example, the barrier filter 41 may be disposed between the second switching valve 36 and the third switching valve 37 in the third water flow path 18, and may be disposed on the downstream side of the third switching valve 37 of the third water flow path 18.

The power source 39 may be in any form as long as it is possible to supply electric power to the electrochemical cell 10 and, for example, may be configured by changing AC voltage supplied from a AC power source such as commercial power supply to DC voltage using a AC/DC converter, or may be configured by a DC power source such as a secondary battery.

The input apparatus 42 is configured so as to set at least any one of a voltage value, an electric current value, and a treatment time. The input apparatus 42 may be configured so as to directly input each treatment time of the water softening treatment/regenerating treatment, or also may be configured so as to input the ion concentration of water to be treated. The input apparatus 42 may be formed of a touch panel, a keyboard, a remote control, and the like.

The controller 40 is configured so as to control the switching valve such as the first switching valve 35 and the power source 39. The controller 40 is provided with a calculation processor 40A exemplified by a microprocessor, CPU, or the like, a storage unit 40B formed of a memory and the like storing a program for executing each of the control operations, and a clock 40C which has a calendar function. Then, the controller 40 performs various types of control relating to the water treatment apparatus 50 by the calculation processor 40A reading a predetermined control program stored in the storage unit 40B and executing the program.

The calculation processor 40A has a voltage and electric current changing unit 401 which determines a voltage value and/or an electric current value of the power source 39 and a treatment time changing unit 402 which determines the length of the treatment time of the water softening treatment and the treatment time of the regenerating treatment. Here, the voltage and electric current changing unit 401 and the treatment time changing unit 402 are realized by executing a predetermined control program stored in the storage unit 40B.

The voltage and electric current changing unit 401 is configured so as to change the voltage applied from the power source 39 to the electrodes at the time of water treatment and/or at the time of regenerating treatment. Due to this, it is possible to adjust the hard component removal amount and it is possible to appropriately adjust the hardness level in the water for treatment. In addition, it is possible to appropriately adjust the regeneration amount of the ion exchange group of the ion exchange composition at the time of the re generating treatment.

Here, it is known that the degree of the ion exchange amount per unit time is changed according to the voltage value and/or the electric current value applied to the electrodes. On the other hand, the total amount of water on which the electrochemical cell 10 is able to carry out water softening treatment changes due to the ion concentration of the water which is treated.

Therefore, the treatment time changing unit 402 is configured so as to be able to change the treatment time of the water softening treatment and the regenerating treatment according to the ion concentration of the water which is treated. Due to this, it is possible to realize the water treatment apparatus 50 which is able to carry out flexible water treatment according to the usage environment.

In detail, the treatment time changing unit 402 is configured so as to change the treatment time such that the treatment time of the water softening treatment is shorter when the ion concentration of the treatment water is large than when the ion concentration is small. In addition, the treatment time changing unit 402 is configured so as to change the treatment time such that the treatment time of the regenerating treatment is longer when the ion concentration of the treatment water is large than when the ion concentration is small.

The treatment time changing unit is more preferably configured so as to change the treatment time such that the ratio (T1/T2) of a treatment time T1 of the water softening treatment and a treatment time T2 of the regeneration treatment is larger when the ion concentration is relatively large.

Here, the water treatment apparatus 50 according to the present exemplary embodiment 4 may be provided with a sensor for measuring the ion content in the water for treatment such as the ion concentration and the pH value in the third water flow path 18 which is on the upstream side of the electrochemical cell 10, and configured such that the treatment time changing unit 402 automatically changes the treatment time according to the measurement value of the sensor.

Here, the controller 40 may be not only in a form of being formed of a single controller, but also in a form of being formed of a controller group which controls the water treatment apparatus 50 through cooperation between a plurality of controllers. In addition, the controller 40 may be formed of a micro controller and may be formed of an MPU, a programmable logic controller (PLC), a logic circuit, and the like.

Since the electrochemical cell 10 according to exemplary embodiment 1 is provided in the water treatment apparatus according to the present exemplary embodiment 4 which is formed in this manner, the same operation and effects as the electrochemical cell 10 according to exemplary embodiment 1 are exhibited.

In addition, in the water treatment apparatus according to the present exemplary embodiment 4, since the scale suppressing agent 38 is disposed on the upstream side of the electrochemical cell 10, it is possible to suppress $CaCO_3$ which is generated at the time of the regenerating treatment from being precipitated to the ion exchange membrane 13 and the like inside the electrochemical cell 10, the inside of the first water flow path 17, the first switching valve 35, or the like.

In addition, in the water treatment apparatus according to the present exemplary embodiment 4, the controller 40 is configured so as to, when executing the water softening treatment after the regenerating treatment, after stopping the power supply to the electrodes for a predetermined time (for example, 1 second to 10 seconds), supply electric power from the power source 39 to the electrode so as to switch the polarity of the electrodes and execute the water softening treatment. Here, water is supplied to the electrochemical cell 10 even while the power supply from the power source 39 to the electrode is stopped. Due to this, calcium ions and the like which are desorbed at the time of the regenerating treatment pass from inside the electrochemical cell 10 through the second water flow path 33 and it is possible to discharge the calcium ions and the like from the water drainage opening. Therefore, when carrying out the water softening treatment on the water again after the regenerating treatment of the water, hard water which is desorbed at the time of the regenerating treatment does not tend to have an influence and it is possible to take favorable soft water from the water intake opening.

Furthermore, in the water treatment apparatus according to the present exemplary embodiment 4, the controller 40 controls the power source so as to gradually (in stages) increase the electric power supplied to the electrode when executing the regenerating treatment. Due to this, when starting the regenerating treatment, a large number of Ca ions are suppressed from being desorbed and excess electric current is suppressed from being generated.

Here, a form is adopted in which the water treatment apparatus 50 according to the present exemplary embodiment 4 is provided with the electrochemical cell 10 according to exemplary embodiment 1; however, without being limited thereto, a form of being provided with the electrochemical cell 10 according to exemplary embodiment 2 or 3 may be adopted.

In addition, the water treatment apparatus 50 according to the present exemplary embodiment 4 is further provided with a flow amount adjusting valve in the third water flow path 18 and the controller 40 may control the flow amount adjusting valve such that the flow amount of water supplied to the electrochemical cell 10 decreases at the time of the regenerating treatment compared to the water treatment time. Due to this, it is possible to reduce the water amount which is discharged at the time of the regenerating treatment and to efficiently execute the regenerating treatment.

Furthermore, the water treatment apparatus 50 according to the present exemplary embodiment 4 may adopt a form in which the second water flow path 33 is provided with a flow amount adjusting device. The flow amount adjusting device may be formed by making a cross-section area of a pipe which forms the second water flow path 33 smaller than the pipe which forms the first water flow path 17. In addition, the flow amount adjusting device may be formed of a flow amount adjusting valve. In this case, the controller 40 may control the flow amount adjusting valve such that the flow amount of water supplied to the electrochemical cell 10 decreases at the time of the regenerating treatment compared to the water treatment time. Due to this, it is possible to reduce the water amount which is discharged at the time of the regenerating treatment and to efficiently execute the regenerating treatment.

From the description described above, the many improvements and other exemplary embodiments of the present invention will be clear to a person skilled in the art. Therefore, the description described above should be only interpreted as an example and is provided for the purpose of instructing a person skilled in the art the best form for executing the present invention. Without departing from the gist of the present invention, it is possible to substantially change the details of the structure and/or the functions thereof. In addition, it is possible to form various types of inventions by the appropriate combination of a plurality of constituent elements which are disclosed in the exemplary embodiments described above.

INDUSTRIAL APPLICABILITY

According to the ion exchange membrane, the ion exchange membrane laminated body provided with the ion exchange membrane, the electrochemical cell provided with the ion exchange membrane laminated body, and the water treatment apparatus provided with the electrochemical cell according to the present invention, it is possible to sufficiently adsorb hard components and it is also possible to efficiently regenerate an ion exchange composition, which is useful in the field of water treatment.

REFERENCE MARKS IN THE DRAWINGS 1 cation exchange composition
1A first cation exchange composition
1B second cation exchange composition
2 anion exchange composition
2A first anion exchange composition
2B second anion exchange composition
4 cation ion exchange resin particle
4A first cation exchange resin particle
4B second cation exchange resin particle
5 first binder resin particle
5A first binder resin particle
5B first binder resin particle
6 anion exchange resin particle
6A first anion exchange resin particle
6B second anion exchange resin particle
7 second binder resin particle
7A second binder resin particle
7B second binder resin particle
10 electrochemical cell
11 anode
11A terminal
12 cathode
12A terminal
13 ion exchange membrane
13A cation exchange surface
13B anion exchange surface
13C interface
14 spacer member
14A first member
14B second member
14C portion
14D space
15 ion exchange membrane laminated body
15A ion exchange membrane laminated body
15B ion exchange membrane laminated body
15C ion exchange membrane laminated body
16A partitioning board
16B partitioning board
16C partitioning board
16D partitioning board
17 first water flow path (outflow pipe)
18 third water flow path (inflow pipe)
19 second sealing member
20 casing
21 outflow opening
22 inflow opening
23 second rectification member
24 first rectification member
26 first outer board
27 second outer board
28 through hole
29 first sealing member
31 separator
32 separator
33 second water flow path
34 fourth water flow path
35 first switching valve
36 second switching valve
37 third switching valve
38 scale suppressing agent
39 power source
40 controller
40A calculation processor
40B storage unit
40C clock
41 barrier filter
42 input apparatus
50 water treatment apparatus
60 core material
61 first lid member
62 second lid member
63 third lid member
63a protrusion
64 fourth lid member
65 through hole
70 fixing member
73 third sealing member
74 fourth sealing member
75 fifth sealing member
76 sixth sealing member
77 seventh sealing member
78 eighth sealing member
80 membrane module
101 cation exchange layer
102 anion exchange layer
103 peak
104 trough
105 textured membrane
106 arrow
107 electrode
108 electrode
109 interface
401 voltage and electric current changing unit
402 treatment time changing unit

The invention claimed is:
1. An electrochemical cell comprising:
an ion exchange membrane laminated body;
electrodes which are disposed such that an anode and a cathode are opposed to each other; and
a partitioning board which has water permeability,
wherein the ion exchange membrane laminated body is disposed between the electrodes,
the ion exchange membranes are laminated in a direction orthogonal with respect to a vertical direction,
two or more of the ion exchange membrane laminated bodies are disposed to be lined up when viewed from a lamination direction of the ion exchange membranes,
the partitioning board is installed between two adjacent ones of the ion exchange membrane laminated bodies, and
the ion exchange membrane laminated body comprises:
two or more ion exchange membranes that are laminated to be opposed; and
a spacer member which is disposed between two adjacent ones of the ion exchange membranes and having a communicating structure between front and rear surfaces,
each of the two or more ion exchange membranes comprising:
a first cation exchange composition which has a cation exchange group, and which is formed in a sheet form, and through which water does not easily permeate;

a first anion exchange composition which is disposed to be in contact with the first cation exchange composition, which has an anion exchange group, and which is formed in a sheet form, and through which water does not easily permeate;

a second cation exchange composition which has a cation exchange group, is formed in a sheet form, and which is disposed to be opposed to the first cation exchange composition, and through which water permeates more easily than in the first cation exchange composition; and a second anion exchange composition which has an anion exchange group, which is formed in a sheet form, and which is disposed to be opposed to the first anion exchange composition, and through which water permeates more easily than in the first anion exchange composition.

2. The electrochemical cell according to claim 1, wherein the first cation exchange composition is provided with a cation exchange resin which has the cation exchange group, and a binder resin, and the first anion exchange composition is provided with an anion exchange resin which has the anion exchange group, and a binder resin.

3. The electrochemical cell according to claim 2, wherein the second cation exchange composition is provided with a cation exchange resin which has the cation exchange group and a binder resin, and the second anion exchange composition is provided with an anion exchange resin which has the anion exchange group and a binder resin.

4. The electrochemical cell according to claim 3, wherein an amount of the binder resin which is contained in the first cation exchange composition and the first anion exchange composition is more than an amount of the binder resin which is contained in the second cation exchange composition and the second anion exchange composition.

5. The electrochemical cell according to claim 1, further comprising:

a cylindrical core material, wherein the ion exchange membrane laminated body is wound on an outer peripheral surface of the core material such that an end of the ion exchange membrane and an end of the spacer member are shifted and the end of the spacer member is exposed between the ends of the two layers of the ion exchange membranes when viewed from a lamination direction of the ion exchange membranes.

6. The electrochemical cell according to claim 5, further comprising:

a cylindrical casing having an inflow opening provided in a lower section; and an outflow pipe which is disposed inside the core material such that an upstream end of the outflow pipe is positioned above the inflow opening.

7. The electrochemical cell according to claim 6, further comprising:

an inflow pipe which is disposed in the inflow opening so as to be inclined in a direction other than a direction orthogonal with respect to a tangential line of an inner peripheral surface of the casing.

8. The electrochemical cell according to claim 1, further comprising:

a casing having an inflow opening provided in a lower section and an outflow opening provided in an upper section; and a first rectification member which is disposed between the inflow opening and the ion exchange membrane laminated body positioned to be lowest and which is formed with a taper so as to expand from bottom to top when viewed from a lamination direction of the ion exchange membranes.

9. A water treatment apparatus comprising:

the electrochemical cell according to claim 1;

a power source which supplies electric power to the electrode;

a first water flow path which is connected to the outflow opening, which has a water intake opening, and through which water passes;

a second water flow path which is branched from the first water flow path and has a water drainage opening;

a flow path switching device which switches flow of water to the water intake opening or the water drainage opening; and a controller which controls the power source and the flow path switching device.

* * * * *